US010482442B2

(12) United States Patent
Priebatsch

(10) Patent No.: US 10,482,442 B2
(45) Date of Patent: Nov. 19, 2019

(54) CROSS-PLATFORM ORDERING AND PAYMENT-PROCESSING SYSTEM AND METHOD

(71) Applicant: SCVNGR, INC., Boston, MA (US)

(72) Inventor: Seth Priebatsch, Boston, MA (US)

(73) Assignee: SCVNGR, INC., Boston, MA (US)

( * ) Notice: Subject to any disclaimer, the term of this patent is extended or adjusted under 35 U.S.C. 154(b) by 432 days.

(21) Appl. No.: 15/281,851

(22) Filed: Sep. 30, 2016

(65) Prior Publication Data

US 2017/0098207 A1 Apr. 6, 2017

Related U.S. Application Data

(60) Provisional application No. 62/236,431, filed on Oct. 2, 2015.

(51) Int. Cl.
| | |
|---|---|
| *G06Q 20/20* | (2012.01) |
| *G06Q 10/08* | (2012.01) |
| *H04L 29/08* | (2006.01) |
| *G06Q 30/06* | (2012.01) |
| *H04W 4/21* | (2018.01) |
| *G06Q 50/12* | (2012.01) |
| *H04W 4/02* | (2018.01) |
| *G06Q 20/32* | (2012.01) |

(52) U.S. Cl.
CPC ....... *G06Q 20/202* (2013.01); *G06Q 10/0836* (2013.01); *G06Q 20/3224* (2013.01); *G06Q 30/0619* (2013.01); *G06Q 30/0633* (2013.01); *G06Q 50/12* (2013.01); *H04L 67/18* (2013.01); *H04W 4/023* (2013.01); *H04W 4/21* (2018.02)

(58) Field of Classification Search
CPC ........ G06Q 30/00; G06Q 10/08; G06Q 10/00; G06Q 30/06; G06F 17/30
USPC ...... 705/15, 330, 339, 7.29, 26.1, 338, 7.19; 700/236
See application file for complete search history.

(56) References Cited

U.S. PATENT DOCUMENTS

| | | | | |
|---|---|---|---|---|
| 3,702,583 A | * | 11/1972 | Rullman | A47J 37/04 99/335 |
| 4,723,614 A | * | 2/1988 | Lahti | G01G 7/06 177/120 |
| 4,797,818 A | * | 1/1989 | Cotter | G06Q 10/087 379/912 |
| 4,974,747 A | * | 12/1990 | Ahlstrom | G07F 9/105 221/87 |
| 5,197,376 A | * | 3/1993 | Bird | A21B 5/00 99/330 |
| 5,522,310 A | * | 6/1996 | Black, Sr. | A47J 27/14 221/113 |
| 5,736,940 A | * | 4/1998 | Burgener | G08G 1/123 340/991 |
| 6,280,784 B1 | * | 8/2001 | Yang | A21C 11/163 426/231 |

(Continued)

*Primary Examiner* — Olusegun Goyea
(74) *Attorney, Agent, or Firm* — Hickman Palermo Becker Bingham LLP; Maryam Imam

(57) ABSTRACT

Various embodiments of the present approach and system include a novel ordering and integrated transaction system for providing consumers information about the merchants, such as locations of available retail merchants, menu items from the merchants, "line time" or "wait time" at the merchant locations, a make time for completing preparation of the consumer's order, etc.

12 Claims, 16 Drawing Sheets

(56) References Cited

U.S. PATENT DOCUMENTS

| | | | | |
|---|---|---|---|---|
| 6,280,785 B1* | 8/2001 | Yang | A21C 11/163 | 426/231 |
| 6,317,686 B1* | 11/2001 | Ran | G01C 21/3691 | 701/117 |
| 6,843,166 B1* | 1/2005 | Li | A47J 27/14 | 99/327 |
| 7,027,996 B2* | 4/2006 | Levinson | G06Q 10/06311 | 705/7.26 |
| 7,183,518 B2* | 2/2007 | Near | A47J 36/321 | 219/214 |
| 7,680,690 B1* | 3/2010 | Catalano | G06Q 30/02 | 186/38 |
| 7,762,181 B2* | 7/2010 | Boland | A47J 31/40 | 99/321 |
| 7,974,873 B2* | 7/2011 | Simmons | G06Q 10/06313 | 705/7.29 |
| 8,204,757 B2* | 6/2012 | Carlson | G06Q 10/02 | 705/1.1 |
| 2002/0055878 A1* | 5/2002 | Burton | G06Q 30/06 | 705/27.2 |
| 2003/0050854 A1* | 3/2003 | Showghi | G06Q 10/02 | 705/15 |
| 2003/0051606 A1* | 3/2003 | Cusenza | A47J 27/16 | 99/357 |
| 2003/0071806 A1* | 4/2003 | Annand | G06Q 30/06 | 345/418 |
| 2003/0125963 A1* | 7/2003 | Haken | G06Q 10/08 | 705/26.1 |
| 2003/0236706 A1* | 12/2003 | Weiss | G06Q 30/06 | 705/15 |
| 2004/0044469 A1* | 3/2004 | Bender | G01C 21/36 | 701/532 |
| 2004/0054554 A1* | 3/2004 | Barts | G06Q 10/063 | 705/7.11 |
| 2004/0073448 A1* | 4/2004 | Barts | G06Q 10/063 | 705/330 |
| 2004/0073449 A1* | 4/2004 | Yang | G06Q 10/08 | 705/330 |
| 2004/0214597 A1* | 10/2004 | Suryanarayana | G06Q 20/20 | 455/552.1 |
| 2004/0226775 A1* | 11/2004 | Takatama | G06Q 30/06 | 186/53 |
| 2004/0238555 A1* | 12/2004 | Parks | G07F 9/105 | 221/80 |
| 2005/0267811 A1* | 12/2005 | Almblad | G06Q 30/06 | 705/15 |
| 2006/0081653 A1* | 4/2006 | Boland | A47J 31/40 | 222/243 |
| 2006/0108415 A1* | 5/2006 | Thomas | B67D 1/0884 | 235/381 |
| 2006/0191885 A1* | 8/2006 | Near | A47J 36/321 | 219/214 |
| 2007/0150375 A1* | 6/2007 | Yang | G06Q 10/08 | 705/339 |
| 2007/0168205 A1* | 7/2007 | Carlson | G06Q 10/02 | 705/15 |
| 2007/0185785 A1* | 8/2007 | Carlson | G06Q 30/0603 | 705/26.8 |
| 2007/0292573 A1* | 12/2007 | Smith | A23G 3/0097 | 426/383 |
| 2009/0236333 A1* | 9/2009 | Ben-Shmuel | H05B 6/6402 | 219/702 |
| 2009/0236334 A1* | 9/2009 | Ben-Shmuel | B65D 81/3453 | 219/703 |
| 2009/0236335 A1* | 9/2009 | Ben-Shmuel | H05B 6/6402 | 219/710 |
| 2010/0250384 A1* | 9/2010 | Bhargava | G01C 21/343 | 705/26.1 |
| 2010/0268378 A1* | 10/2010 | Sharpley | A47J 31/52 | 700/233 |
| 2011/0022298 A1* | 1/2011 | Kronberg | G01C 21/3484 | 701/532 |
| 2011/0031236 A1* | 2/2011 | Ben-Shmuel | H05B 6/6402 | 219/620 |
| 2011/0055044 A1* | 3/2011 | Wiedl | G06Q 30/02 | 705/26.5 |
| 2011/0218839 A1* | 9/2011 | Shamaiengar | G06Q 30/0203 | 705/7.32 |
| 2011/0231212 A1* | 9/2011 | Hurley | G06Q 10/02 | 705/5 |
| 2011/0300270 A1* | 12/2011 | Koppens | A47J 27/004 | 426/115 |
| 2015/0006327 A1* | 1/2015 | Studor | G06Q 10/087 | 705/26.63 |
| 2015/0120600 A1* | 4/2015 | Luwang | G06Q 10/08355 | 705/338 |
| 2015/0248651 A1* | 9/2015 | Akutagawa | G06Q 10/1095 | 705/7.19 |
| 2015/0324936 A1* | 11/2015 | Wilson | G06Q 50/12 | 705/15 |

* cited by examiner

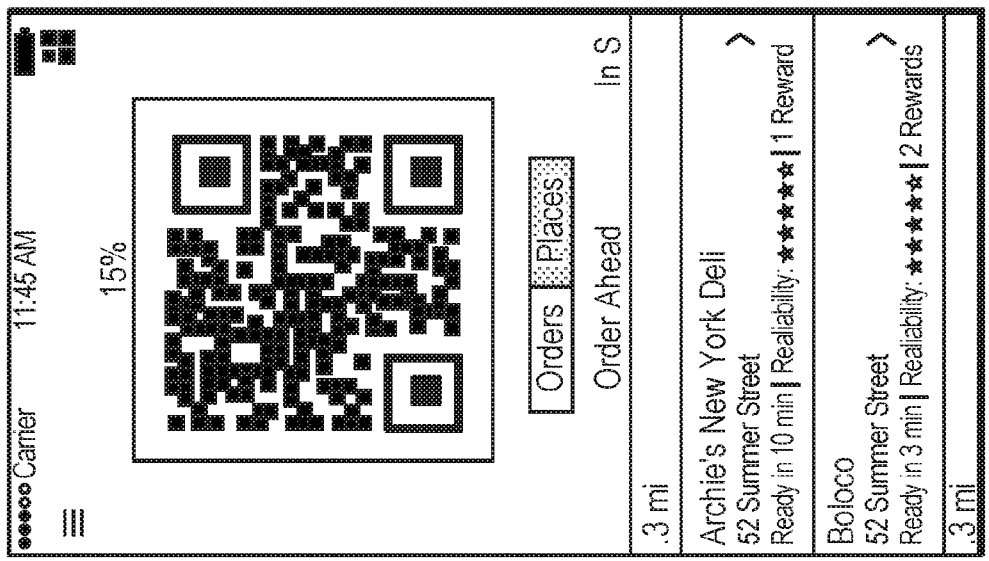
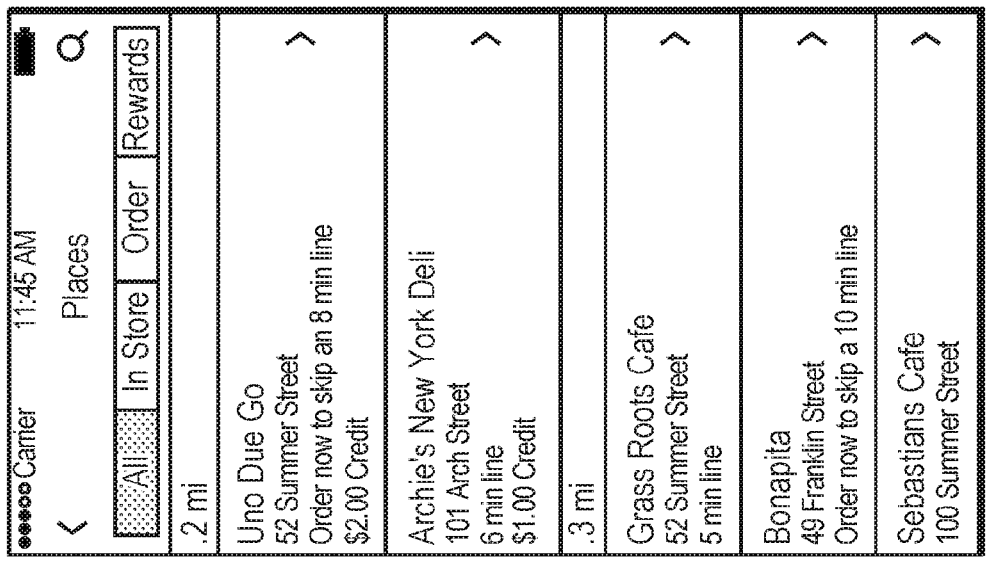
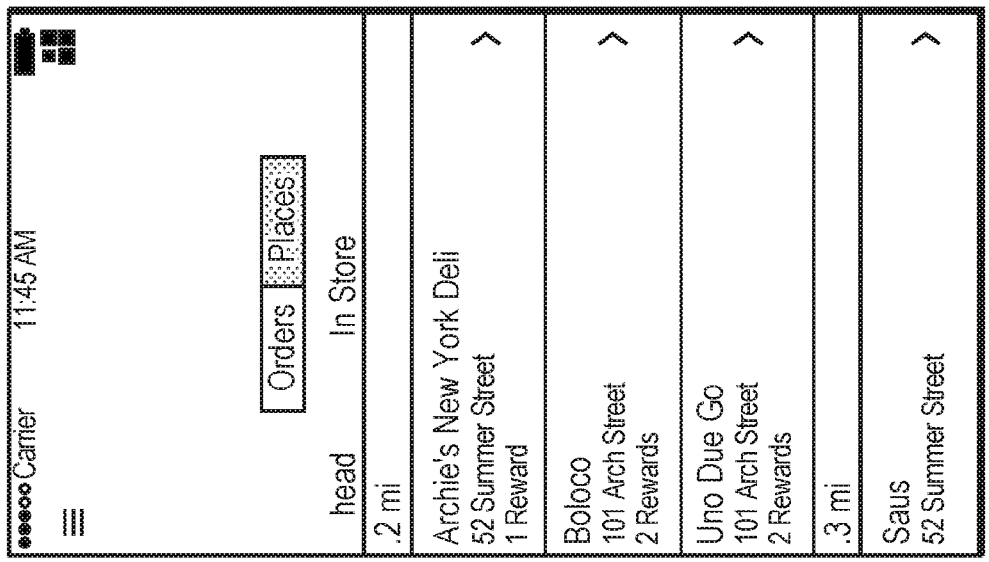
FIG. 4A
FIG. 4B
FIG. 4C

CROSS-PLATFORM ORDERING AND PAYMENT-PROCESSING SYSTEM AND METHOD

RELATED APPLICATION

This application claims the benefit of and priority to U.S. Provisional Patent Application No. 62/236,431, filed Oct. 2, 2015, the entire disclosure of which is hereby incorporated by reference.

FIELD OF THE INVENTION

The inventions described herein relate generally to the field of payment and ordering systems, and more specifically to improved systems and methods for facilitating the selection, ordering, purchase, pickup, and payment for physical goods and/or services provided to a consumer at a retail point of sale, as well as information sharing, messaging, and interaction between and among purchasers and retail sellers.

BACKGROUND

The ordering and purchase of physical goods and services via the Internet is today commonplace. In the market for retail prepared foods, including fast-casual, quick-service, and full-service restaurants, consumers may place an electronic order with a retail food merchant via the Internet ("online ordering"), for example, through a web browser on a consumer computing device or through an application running on a consumer mobile computing device, for food to be delivered by the merchant or a third party to a specified location ("delivery"), or to be picked up by the consumer at the food merchant's retail location ("order ahead"). Online ordering systems may facilitate the consumer's payment for the goods or services through an Internet-based electronic transaction to a credit or debit card, or other payment source. Such online ordering services for retail prepared-food merchants are provided by a variety of third parties, each with proprietary systems and methods.

These known online ordering systems, including delivery and/or order-ahead systems, may enable a consumer to utilize a web browser or mobile application to select an item or items for purchase, customize items, select a time and location at which the consumer will pick up the item(s), and permit the consumer to initiate an electronic transaction (for example, using a credit or debit card) to make payment for the ordered item(s). The service or application (and associated web servers) used to accept the consumer's order via the Internet then may communicate the order to the retail food merchant's in-store point-of-sale (POS) and/or inventory system, or communicate the order to the merchant's retail location to another merchant computer systems or by some other means, such as telephone, email, or facsimile.

These known systems may be offered by third-party "aggregators" that enable Internet-based ordering at a variety of unaffiliated merchants. Such aggregator services vary widely in terms of merchant coverage, regional coverage, presence and quality of integration to (and communication with) a merchant's POS hardware and software, and also in terms of speed of order and/or delivery and cost to both consumer and merchant. Alternatively, the ordering system may be proprietary to the retail food merchant and/or a third party that provides branded software and technology to enable order-ahead features for the retail merchant. Such proprietary ordering systems generally require the consumer to utilize a channel proprietary to the retail food merchant, for example, the retail food merchant's website or mobile application, in order to place an advance order with that retail merchant. The lack of availability for an order-ahead solution across retail merchants, which includes the ability to communicate orders into the merchant's POS hardware and software as part of the merchant's normal ordering process, is a drawback of the current approach to order-ahead systems.

Known ordering systems as described above provide no opportunity for the retail merchant to track or correlate online ordering and purchasing behavior of a consumer with that consumer's ordering and purchasing behavior at the merchant's physical point of sale, either via transactions initiated using a mobile payment application of via a traditional credit card. Such systems also are unable to correlate the customer's online ordering behavior to purchases made at other retail merchants, either online or at physical POS terminals, whether initiated via mobile application or credit card, or online. Accordingly, conventional systems provide at best limited opportunity for temporal and/or item-based marketing, or predictive recommendations, to individual consumers.

Furthermore, known order-ahead systems generally require the consumer to pick up the goods at a specified time, as a consequence of the fact that retail prepared foods typically are delivered to the consumer shortly after a food item is prepared. Conventional systems therefore limit the consumer's ability to time the order pick-up to coincide with the consumer's arrival at the pick-up location. The consumer also remains unaware of the wait (or make) time at the food service locations, so has no basis for deciding between online ordering and ordering in person.

SUMMARY OF THE INVENTION

The present approach and system, in various embodiments, addresses the problems and needs discussed above, and other problems of known online ordering, delivery, and order-ahead systems, by providing a novel ordering and integrated transaction system in communication, via existing networks, with payment-processing systems and servers, merchant POS terminals and online POS software, consumer computer and mobile devices, and servers of third party ordering providers, as well as various software applications ("apps"), including web-hosted apps, mobile apps deployed on a smart phone, tablet or other mobile device, and/or other apps. Systems described herein may be configured to receive from users identification and financial information, and provide to users an identification code or token that can be used to initiate an order and/or a payment transaction via the transaction system.

Transaction systems disclosed herein may provide to consumers (via, for example, mobile and web apps in communication with the transaction system) information concerning the locations of available retail merchants, such as food merchants, and the goods or services, such as menu items, available from each merchant, among other information about the merchant. As described below, a transaction system may retrieve menu item information from a merchant and/or third-party ordering provider, and present the information to the consumer into a harmonized, tiered format that represents a consistent user experience irrespective of the merchant or third-party ordering service from which the menu item information was obtained. The transaction system permits a registered consumer user of such an app to select items to be picked up in-store ("order ahead") or for delivery, and to authorize payment for such goods via conventional financial instruments or tokens (e.g., a credit or debit card, bank account, carrier account, or other payment account information) provided electronically to the transaction system in connection with the order, or previously registered by the user with the transaction system.

As explained herein, the transaction system may be configured such that each merchant or third-party ordering service need not register or have a preexisting relationship with the transaction-system provider in order to accept online orders initiated by a user through the transaction system. The transaction system may interface to various providers and/or merchants through public application programming interfaces (APIs) in order to obtain menu information and place orders, or may integrate more fully to an ordering provider. As a result, a consumer using a single app, such as a mobile application configured to communicate with the disclosed transaction system, will have access to a number of merchants that use proprietary online ordering services that may be incompatible with each other. Where multiple ordering channels are available (e.g., multiple third-party channels and/or a proprietary merchant channel), the transaction system may compare the speed and cost of available fulfillment and/or delivery options and initiate the order by communication to the most efficient and/or least costly option.

Transaction systems in accordance herewith may permit a consumer to initiate a transaction for the purchase of goods and/or services at a merchant POS terminal by communicating a token, previously assigned to the user by the transaction system, to the merchant POS terminal—e.g., from a consumer mobile device via short-range wireless communication, optical scan, radiofrequency communication, or other means. The token is communicated by the merchant POS terminal to the transaction system in order to complete the purchase transaction. In this way, the transaction system permits the correlation of online orders with a consumer's in-store purchasing behavior, which may be useful for marketing analyses and to drive communications between merchant and consumer, as well as for making predictive recommendations to a consumer to encourage and facilitate online ordering via the transaction system.

Transaction systems in accordance herewith may provide the user with additional information not available from known online ordering systems. For example, the transaction system may include, in various embodiments, hardware located in connection with a merchant location for transmitting a Bluetooth or Bluetooth Low Energy ("BLE") signal identifying the hardware. A consumer mobile app detecting that signal can communicate with the transaction system and thereby convey the location of a user in proximity to a merchant POS system. This hardware arrangement permits the transaction system to convey to other users the "line time" or "wait time" at a retail food service merchant.

In addition, the system may accurately predict the user's arrival at a selected merchant location and convey the order for preparation so that it will be ready for pick-up when the customer arrives, thereby sparing the customer the need to estimate and convey an estimated pickup time. For example, transaction systems in accordance herewith may utilize GPS and/or other geolocation data provided by, for example, a consumer mobile app on a consumer mobile device, and/or Bluetooth or BLE beacon information received from a mobile device, in order to ascertain the consumer's location. Either autonomously or using a third-party mapping system, the transaction system may estimate the consumer's arrival time and arrange for the order to be ready at that time (e.g., by instructions electronically provided to the merchant or to preparation staff). This permits the consumer to make an order-ahead request to have the goods ready at the time the consumer arrives at a location, rather than at a specified time. The transaction system may, in addition, periodically monitor the consumer's location to assess progress and adjust the expected arrival time accordingly. The transaction system, which is configured to facilitate payment, may charge a premium price to the consumer for this "make-it-now" service and/or any of the other benefits and advantages described herein. It may also offer the "make-it-now" option only if it fulfillment is currently possible—i.e., the user is far enough away from the provider that, given the provider's current backlog, the order can be ready when the user is likely to arrive. In some embodiments, the system may use the consumer's desired order and current location to identify merchants capable of fulfilling a "make-it-now" order, given reported merchant backlogs and locations.

The transaction system may also be configured to store profile information for registered users and retail merchants, permitting the transaction system to store information concerning a user's past purchase activity and to make recommendations based on a user's favorite items and/or the most popular items at a selected retail merchant.

Transaction systems disclosed herein may be configured to integrate to (i.e., communicate and exchange data with) a plurality of independent and/or proprietary online ordering systems, and may further automatically arbitrate among various possible providers for online ordering service in order to determine the least-expensive option for a consumer wishing to place an online order. For example, a consumer desiring a pizza delivery from a selected merchant may have multiple options for online delivery ordering to choose from. The transaction system, through consumer-facing web and/or mobile apps, is configured to receive order information and determine the most cost effective ordering option to have the order conveyed to the retail food merchant and/or to identify the most cost effective delivery service or mechanism.

Accordingly, in one aspect, the invention pertains to a system for managing consumer pickup orders for goods. In various embodiments, the system includes multiple merchant point-of-sale (POS) systems, each of the POS systems having a terminal for processing sales of goods and a communications interface for communicating over a telecommunication network; a transaction server having (i) a merchant database, (ii) a user database, and (iii) a communications interface for communicating over the telecommunication network; and a user device having a processor and a memory for executing applications as running processes and receiving user input relating thereto. In one implementation, the POS systems are each configured to periodically generate a current wait time for order preparation and to transmit the current wait time to the transaction-management server via the telecommunication network; the user device executes an application for receiving a user-provided order of goods and transmitting the order to the transaction server for processing; the merchant database includes records each specifying a merchant, goods sold by the merchant, a pickup geolocation of the merchant, and a current wait time for order preparation; the user database includes records each specifying a user and payment information for the user; and the transaction server is configured to (i) receive an order for goods from a user device of an ordering user, (ii) obtain payment information for the ordering user from the user database, (iii) select a merchant offering the ordered goods, (iv) determine a wait time for preparation of the ordered goods for pickup based on the current wait time in the selected merchant's record in the merchant database, (v) obtain a geolocation of the user, (vi) based on the user geolocation and the merchant pickup geolocation, estimate a travel time of the user to a pickup location of the selected merchant, and (vii) if the order preparation time does not exceed the user travel time, cause the order to be placed with the selected merchant as a pickup order.

The merchant and merchant location may be designated in the user's order. In addition, the transaction server may be configured to select the merchant or merchant location based on the goods in the ordering user's order and merchants or merchant locations having records in the merchant database specifying availability of the goods in the user's order. In some embodiments, the user device is configured to determine its geolocation and the transaction server is configured to receive the ordering user's geolocation from the user device. For example, the transaction server may be configured to determine the ordering user's geolocation based on information received from the user device based on a communication between the user device and a beacon having a known geolocation and that has been detected the user device.

In various embodiments, the POS systems or servers of the merchant are further configured to segment the transmitted current wait times by categories of goods, and the transaction server is further configured to (i) determine a category of goods for each of the goods in the user's order and (ii) determine the wait time based on the determined categories of goods. The wait time corresponds to a longest wait time associated with the determined categories of goods. The transaction server may be further configured to select the merchant or merchant location offering the ordered goods by (i) identifying merchants or merchant locations offering the ordered goods and a wait time for the goods associated with each of the identified merchants, and (ii) communicating, to the user, the identified merchants and/or merchant locations and specifying the merchant with a wait time most closely matching the user travel time, and (iii) receiving the user's selection of a merchant from among the identified merchants.

In another aspect, the invention relates to a transaction server for managing consumer pickup orders for goods. In various embodiments, the server includes a processor; a communication facility in communication, over a telecommunication system, with (i) multiple merchant POS systems and (ii) a user device; a merchant database including records each specifying a merchant, goods sold by the merchant, a pickup geolocation of the merchant, and a current wait time for order preparation; and a user database including records each specifying a user, a user device associated with the user, and payment information for the user. In one implementation, the processor is configured to: (a) receive, via the communication facility, current wait times for order preparation from the merchants and store the wait times in the merchant database; (b) receive, via the communication facility, an order of goods from an ordering user sent from a user device; (c) retrieve, from the user database, a database record of a user associated with the order of goods; (d) select a database record corresponding to a merchant offering the ordered goods; (e) determine a wait time for preparation of the ordered goods for pickup based on the current wait time in the selected merchant's record in the merchant database; (f) obtain a geolocation of the user; (g) based on the user geolocation and the merchant pickup geolocation, estimate a travel time of the user to a pickup location of the selected merchant, and (i) if the order preparation time does not exceed the user travel time, cause the order to be placed with the selected merchant as a pickup order.

The merchant may be designated in the user's order. In addition, the processor may be configured to select the merchant based on the goods in the ordering user's order and merchants having records in the merchant database specifying availability of the goods in the user's order. In some embodiments, the processor is configured to receive a user geolocation from the user device. For example, the processor may be configured to receive a user geolocation from a beacon having a known geolocation and that has detected the user.

In various embodiments, the processor is further configured to (i) determine a category of goods for each of the goods in the user's order and (ii) determine the wait time based on the determined categories of goods. The wait time corresponds to a longest wait time associated with the determined categories of goods. Additionally, the processor may be further configured to select the merchant offering the ordered goods by (i) identifying merchants offering the ordered goods and a wait time for the goods associated with each of the identified merchants, and (ii) communicating, to the user, the identified merchants and specifying the merchant with a wait time most closely matching the user travel time, and (iii) receiving the user's selection of a merchant from among the identified merchants.

Another aspect of the invention relates to a method of managing consumer pickup orders for goods. In various embodiments, the method includes the steps of: providing multiple merchant POS systems and a user device of a user; periodically receiving, from the POS systems or associated ordering servers, a current wait time for order preparation; receiving an order of goods from the user device of an ordering user; retrieving payment information for the ordering user from a user database; computationally selecting, from a merchant database, a merchant offering the ordered goods; determining a wait time for preparation of the ordered goods for pickup based on the current wait time reported by the POS of the selected merchant; obtaining a geolocation of the user; based on the user geolocation and the merchant pickup geolocation, estimating a travel time of the user to a pickup location of the selected merchant; and if the order preparation time does not exceed the user travel time, causing the order to be placed with the POS of the selected merchant as a pickup order.

The merchant may be designated in the user's order. In addition, the merchant may be selected based on the goods in the ordering user's order and merchants having records in the merchant database specifying availability of the goods in the user's order. The user's geolocation may be obtained from the user device and/or a beacon having a known geolocation and that has detected the user.

In some embodiments, the POS systems are configured to segment the transmitted current wait times by categories of goods; the method further includes the steps of determining a category of goods for each of the goods in the user's order and determining the wait time based on the determined categories of goods. The wait time corresponds to a longest wait time associated with the determined categories of goods. In one embodiment, the merchant offering the ordered goods is selected according to steps including (i) identifying merchants offering the ordered goods and a wait time for the goods associated with each of the identified merchants, (ii) communicating, to the user, the identified merchants and specifying the merchant with a wait time most closely matching the user travel time, and (iii) receiving the user's selection of a merchant from among the identified merchants.

In yet another aspect, a system for managing consumer orders for goods includes, in various embodiments, multiple merchant POS systems, each of the POS systems having a terminal for processing sales of goods and a communications interface for communicating over a telecommunication network; a transaction server having (i) a merchant database, (ii) a user database, (iii) a payment module, and (iv) a communications interface for communicating over the telecommunication network; and a user device having a processor and a memory for executing applications as running processes and receiving user input relating thereto. In one implementation, the user device executes an application for receiving a user-provided order of goods and transmitting the order to the transaction server for processing; the merchant database includes records each specifying a merchant and goods sold by the merchant, the goods being organized into multiple item categories; the user database includes records each specifying (i) a user, (ii) information corresponding to payment information for the user, and (iii) a list of previous orders of goods from merchants in the merchant database. In addition, the transaction server is configured to (i) receive a merchant selection from a user device of an ordering user; (ii) retrieve, from the user database, the ordering user's previous purchases from the selected merchant; (iii) retrieve, from the merchant database, item categories corresponding to goods previously purchased by the ordering user and goods currently offered by the selected merchant within the retrieved item categories; (iv) transmit, for display on the user device of the ordering user, ordering options including goods offered by the selected merchant, and available configuration options for such items, the retrieved categories and a one-touch order button permitting the order to be placed with a predetermined configuration; (v) receive, from the user device of the ordering user, an order having signals indicative of selection of one or more of the displayed goods and the one-touch order button; and (vi) retrieve payment information for the user from the user database and consummate the order with the selected merchant. The ordering options within the retrieved categories may include or consist of goods that the user has previously ordered. In addition, the ordering options within the retrieved categories may include or consist of goods that the user has not previously ordered or has previously designated as favorites.

Still another aspect of the invention relates to a transaction server for managing consumer orders for goods. In various embodiments, the server includes a processor; a communication facility in communication, over a telecommunication system, with (i) multiple merchant POS systems and (ii) a user device; a merchant database including records each specifying a merchant and goods sold by the merchant, the goods being organized into multiple item categories; and a user database including records each specifying (i) a user, (ii) payment information for the user, and (iii) a list of previous orders of goods from merchants in the merchant database. In one implementation, the processor is configured to: (a) receive, via the communication facility, a merchant selection from a user device of an ordering user; (b) retrieve, from the user database, the ordering user's previous purchases from the selected merchant; (c) retrieve, from the merchant database, item categories corresponding to goods previously purchased by the ordering user and goods currently offered by the selected merchant within the retrieved item categories; (d) transmit, via the communication facility for display on the user device of the ordering user, ordering options including goods offered by the selected merchant within the retrieved categories and a one-touch order button; (e) receive, via the communication facility from the user device of the ordering user, an order including signals indicative of selection of one or more of the displayed goods and the one-touch order button, (f) retrieve payment information for the user from the user database; and (g) cause the order to be consummated with the selected merchant using the retrieved payment information. The ordering options within the retrieved categories may include or consist of goods that the user has previously ordered. In addition, the ordering options within the retrieved categories may include or consist of goods that the user has not previously ordered or has previously designated as favorites.

In another aspect, the invention relates to a method of managing consumer orders for goods. In various embodiments, the method includes the steps of: providing multiple merchant POS systems and a user device of an ordering user; receiving a merchant selection from the user device; retrieving, from a user database, the ordering user's previous purchases from the selected merchant; retrieving, from a merchant database, item categories corresponding to goods previously purchased by the ordering user and goods currently offered by the selected merchant within the retrieved item categories; displaying, on the user device of the ordering user, ordering options including goods offered by the selected merchant within the retrieved categories and a one-touch order button; receiving an order including signals indicative of selection of one or more of the displayed goods and the one-touch order button; retrieving payment information for the user from the user database; and causing the order to be consummated with the selected merchant using the retrieved payment information. The ordering options within the retrieved categories may include or consist of goods that the user has or has not previously ordered and/or has previously designated as favorites.

In still another aspect, a system for managing consumer pickup orders for goods includes multiple merchant POS systems, each of the POS systems having a terminal for processing sales of goods and a communications interface for communicating over a telecommunication network; a transaction server having (i) a merchant database, (ii) a user database, and (iii) a communications interface for communicating over the telecommunication network; and a user device having a processor and a memory for executing applications as running processes and receiving user input relating thereto. In one implementation, the user device executes an application for receiving a merchant designation and transmitting the order to the transaction server; the merchant database includes records each specifying a merchant, goods sold by the merchant, and a current customer wait time received from the POS system of the specified merchant. In addition, the transaction server is configured to (i) periodically receive a current customer wait time, the customer wait time being based on a backup delay time for order preparation and a line wait time, (ii) receive a merchant selection from a user device of an ordering user, (iii) retrieve the current wait time in the selected merchant's record in the merchant database, and (iv) transmit the current customer wait time to the user device for display thereon.

The current customer wait times may be received for each of multiple item categories, and the transaction server may be configured to (i) receive an order for goods from the user device along with the merchant selection, (ii) determine item categories for the ordered goods, and (iii) provide the customer wait time based on the determined item categories.

In addition, the current customer wait time may be stored with a timestamp in the merchant database, and the transaction server may be further configured to obtain an updated current customer wait time if the timestamp has an age greater than a threshold. In one embodiment, the current customer wait time is the greater of the backup delay time for order preparation and the line wait time.

In another aspect, the invention pertains to a transaction server for managing consumer pickup orders for goods. In some embodiments, the server includes a processor; a communication facility in communication, over a telecommunication system, with (i) multiple merchant POS systems and/or ordering servers and (ii) a user device; a merchant database having records each specifying a merchant, goods sold by the merchant, and a current wait time for order preparation; and a user database having records each specifying a user, a user device associated with the user, and payment information for the user. In one implementation, the processor is configured to: (a) receive, via the communication facility, current customer wait times, each of the customer wait times being based on a backup delay time for order preparation and a line wait time; (b) store the wait times in the merchant database; (c) receive, via the communication facility, a merchant designation from a user device; (d) retrieve the current wait time in the selected merchant's record in the merchant database; and (e) transmit the current customer wait time to the user device for display thereon.

The current customer wait times may be received for each of multiple item categories, and the processor may be configured to (i) receive an order for goods from the user device along with the merchant selection, (ii) determine item categories for the ordered goods, and (iii) provide the customer wait time based on the determined item categories. In addition, the processor may be further configured to store each of the current customer wait times with a timestamp in the merchant database and to obtain, via the communication facility, an updated current customer wait time if the timestamp has an age greater than a threshold. In one embodiment, the current customer wait time is the greater of the backup delay time for order preparation and the line wait time.

In another aspect, the invention relates to a method of managing consumer orders for goods. In various embodiments, the method includes the steps of: providing a user device and multiple merchant POS systems, each associated with a merchant; receiving current customer wait times, each of the customer wait times being based on a backup delay time for order preparation and a line wait time; receiving a merchant selection from the user device; retrieving the current wait time in the selected merchant's record in the merchant database; and transmitting the current customer wait time to the user device for display thereon.

In one embodiment, a discrete current customer wait time is received for each of multiple item categories; the method further includes the steps of receiving an order for goods from the user device along with the merchant selection, determining item categories for the ordered goods, and providing the customer wait time based on the determined item categories. In addition, the current customer wait times may be each stored with a timestamp in the merchant database, and the method further includes the step of obtaining an updated current customer wait time if the timestamp has an age greater than a threshold. The current customer wait time may be the greater of the backup delay time for order preparation and the line wait time.

Another aspect of the invention relates to a system for managing consumer pickup orders for goods. In some embodiments, the system includes multiple merchant POS systems and merchant ordering servers in communication with the POS systems, each of the POS systems having a terminal for processing sales of goods and a communications interface for communicating over a telecommunication network; a transaction server having (i) a merchant database, (ii) a user database, and (iii) a communications interface for communicating over the telecommunication network; and a user device having a processor and a memory for executing applications as running processes and receiving user input relating thereto. In one embodiment, the user device executes an application for receiving a user-provided order of goods and transmitting the order to the transaction server for processing; the merchant database includes records each specifying a merchant, merchant locations, goods sold by the merchant, prices of the goods, and a current wait time for order preparation received from the POS system or ordering server of the specified merchant at each location; the user database includes records each specifying a user and payment information for the user; and the transaction server is configured to (i) receive an order for goods from a user device of an ordering user, (ii) obtain information corresponding to a payment instrument for the ordering user from the user database, (iii) identify multiple merchants or merchant locations offering the ordered goods, (iv) for each of the identified merchants or locations, determine multiple optimization parameters including a wait time for preparation of the ordered goods based on the current wait time in the selected merchant's or location's record in the merchant database and a price for the user's order, and (v) select one of the identified merchants or locations based on the optimization parameters and cause the order to be placed with the selected merchant.

The optimization parameters may also include delivery availability to a location of the user and/or user-provided indicia of speed, satisfaction and/or reliability associated with the merchant in the merchant database. In some embodiments, the merchant database includes, for each merchant, a pickup geolocation of the merchant; the optimization parameters also include a proximity of the merchant to a current location of the user. Additionally, the optimization parameters may be weighted in accordance with user-specified preferences stored in the user database.

In yet another aspect, a transaction server for managing consumer pickup orders for goods includes, in various embodiments, a processor; a communication facility in communication, over a telecommunication system, with (i) multiple merchant POS systems, (ii) multiple merchant ordering servers in communication with at least some of the POS systems and (iii) a user device; a merchant database having records each specifying a merchant, merchant locations, goods sold by the merchant, prices of the goods, and a current wait time for order preparation received from the POS system or ordering server of the specified merchant at each location; and a user database having records each specifying a user, a user device associated with the user, and payment information for the user. In some embodiments, the processor is configured to: (a) receive, via the communication facility, current wait times for order preparation from the merchants and store the wait times in the merchant database; (b) receive, via the communication facility, an order of goods from an ordering user sent from a user device; (c) retrieve, from the user database, a database record of a user associated with the order of goods; (d) identify multiple merchants offering the ordered goods; (e) determine, for each of the identified merchants, multiple optimization parameters including a wait time for preparation of the ordered goods based on the current wait time in the selected merchant's record in the merchant database and a price for the user's order; and (f) select one of the identified merchants based on the optimization parameters and cause the order to be placed with the selected merchant.

The optimization parameters may also include delivery availability to a location of the user and/or user-provided indicia of speed, satisfaction and/or reliability associated with the merchant in the merchant database. In one embodiment, the merchant database includes, for each merchant, a pickup geolocation of the merchant; the optimization parameters also include a proximity of the merchant to a current location of the user. In addition, the optimization parameters may be weighted in accordance with user-specified preferences stored in the user database.

Still another aspect of the invention relates to a method of managing consumer orders for goods. In various embodiments, the method includes the steps of: providing multiple merchant POS systems, each associated with a merchant, multiple merchant ordering servers in communication with at least some of the POS systems, and a user device; providing a merchant database including records each specifying a merchant, merchant locations, goods sold by the merchant, prices of the goods, and a current wait time for order preparation received from the POS system or ordering server of the specified merchant at each location; receiving, and storing in the merchant database, current customer wait times from the POS systems and/or ordering servers associated with the merchants; receiving an order of goods from an ordering user; querying the merchant database to identify multiple merchants offering the ordered goods; determining, for each of the identified merchants, multiple optimization parameters including a wait time for preparation of the ordered goods based on the current wait time in the selected merchant's record in the merchant database and a price for the user's order; and selecting one of the identified merchants based on the optimization parameters and causing the order to be placed with the selected merchant.

The optimization parameters may also include delivery availability to a location of the user and/or user-provided indicia of speed, satisfaction and/or reliability associated with the merchant in the merchant database. In one implementation, the merchant database includes, for each merchant, a pickup geolocation of the merchant; the optimization parameters also include a proximity of the merchant to a current location of the user. In addition, the optimization parameters may be weighted in accordance with user-specified preferences stored in the user database.

In another aspect, the invention relates to a system for predictively managing consumer pickup orders for goods. In various embodiments, the system includes multiple merchant POS systems, each of the POS systems including a terminal for processing sales of goods and a communications interface for communicating over a telecommunication network and an ordering server; a transaction server including (i) a merchant database, (ii) a user database, and (iii) a communications interface for communicating over the telecommunication network; and a user device including a processor and a memory for executing applications as running processes and receiving user input relating thereto. In one implementation, the user database includes records each specifying a user and payment information for the user; the user device executes an application for receiving a user-provided order of goods and transmitting the order to the transaction server for processing; the transaction server stores, in the user database, information about the order including goods ordered and the date and time of the order; and the merchant database includes records each specifying a merchant and merchant locations, goods sold by the merchant, and a pickup geolocation of the merchant. In addition, the transaction server is configured to (i) predict, for a user, a user order based on previous orders and their dates and times in the user database, a user order prediction including a predicted pickup time and a merchant, (ii) obtain a geolocation of the user, (iii) based on the user geolocation and the pickup geolocation of the predicted merchant, estimate a travel time of the user to the merchant pickup location, and (iv) if a current time plus the estimated travel time is not later than the predicted pickup time, transmit to the user device a proposed order corresponding to the predicted order, and (v) upon user acceptance of the order via the user device, cause the order to be placed with the selected merchant as a pickup order using the user payment information.

In one embodiment, the proposed order is transmitted if the current time plus the estimated travel time is approximately equal to the predicted pickup time. In another embodiment, the proposed order is transmitted if the current time plus the estimated travel time plus the current wait time is approximately equal to the predicted pickup time. The merchant database may also store a current wait time for order preparation received from the POS system of the specified merchant; the proposed order is transmitted if the current time plus the estimated travel time plus the current wait time is not later than the predicted pickup time. In addition, the POS systems may be each configured to periodically generate a current wait time for order preparation and to transmit the current wait time to the transaction-management server via the telecommunication network.

In still another aspect, a transaction server for predictively managing consumer pickup orders for goods includes a processor; a communication facility in communication, over a telecommunication system, with (i) multiple merchant POS systems, (ii) multiple merchant ordering servers in communication with at least some of the POS systems and (iii) a user device; a merchant database including records each specifying a merchant, merchant locations, goods sold by the merchant, prices of the goods, and a current wait time for order preparation received from the POS system or ordering server of the specified merchant at each location; and a user database including records each specifying a user, a user device associated with the user, payment information for the user, and order history entries each specifying goods ordered and a date and time of the order. In various embodiments, the processor is configured to: (a) predict, for a user, an order based on previous orders and their dates and times in the user database, a user order prediction including a predicted pickup time and a merchant; (b) obtain a geolocation of the user; (c) based on the user geolocation and the pickup geolocation of the predicted merchant, estimate a travel time of the user to the merchant pickup location; (d) transmit to the user device, via the communication facility, a proposed order corresponding to the predicted order if a current time plus the estimated travel time is not later than the predicted pickup time; (d) receive, via the communication facility, user acceptance of the order; and (e) cause the order to be placed with the selected merchant as a pickup order using the user payment information.

In one embodiment, the proposed order is transmitted if the current time plus the estimated travel time is approximately equal to the predicted pickup time. In another embodiment, the proposed order is transmitted if the current time plus the estimated travel time plus the current wait time is approximately equal to the predicted pickup time. The merchant database may also store a current wait time for order preparation received from the POS system of the specified merchant; the proposed order being transmitted if the current time plus the estimated travel time plus the current wait time is not later than the predicted pickup time.

In another aspect, the invention pertains to a method of predictively managing consumer pickup orders for goods. In some embodiments, the method includes the steps of: providing multiple merchant POS systems, multiple merchant ordering servers in communication with at least some of the POS systems, and a user device of a user; predicting, for a user, an order based on previous orders and their dates and times in the user database, a user order prediction including a predicted pickup time and a merchant; obtaining a geolocation of the user; based on the user geolocation and the pickup geolocation of the predicted merchant, estimating a travel time of the user to the merchant pickup location; transmitting to the user device, via the communication facility, a proposed order corresponding to the predicted order if a current time plus the estimated travel time is not later than the predicted pickup time; receiving, via the communication facility, user acceptance of the order; and causing the order to be placed with the selected merchant as a pickup order using the user payment information.

In one embodiment, the proposed order is transmitted if the current time plus the estimated travel time is approximately equal to the predicted pickup time. In another embodiment, the proposed order is transmitted if the current time plus the estimated travel time plus the current wait time is approximately equal to the predicted pickup time. In addition, the method may further includes the steps of periodically receiving, from the POS systems, a current wait time for order preparation; the proposed order is transmitted if the current time plus the estimated travel time plus the current wait time is not later than the predicted pickup time.

Still another aspect of the invention relates to a method for conducting a remote transaction. In various embodiments, the method includes, at a transaction and ordering management server: receiving, via a communication network, information from a user mobile device associated with a user, the information including a user identity and/or a user payment instrument; assigning a code to the user and communicating the code to the user mobile device; acquiring, from multiple ordering servers, information corresponding to identities of multiple merchants and information corresponding to items offered for sale by the merchants; communicating merchant and item information to the mobile device for display thereon; receiving from the mobile device a transaction request including the user code and/or information corresponding to one or more merchants and one or more items; selecting, based on the information received from the mobile device, an ordering server; generating a temporary profile for the user, the profile including a unique email address, user name, and/or password; communicating, to the selected ordering server, the temporary user profile information and the payment instrument information, wherein the payment instrument information is not associated with the ordering user, in order to complete a payment transaction for the order; communicating order confirmation information to the user device; and communicating the user payment instrument information to a payment-processing server to create a charge to the user's payment instrument.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIGS. 4A-4C depict exemplary forms of merchant listing within an application according to embodiments of the present invention.

DETAILED DESCRIPTION

Figure 1:
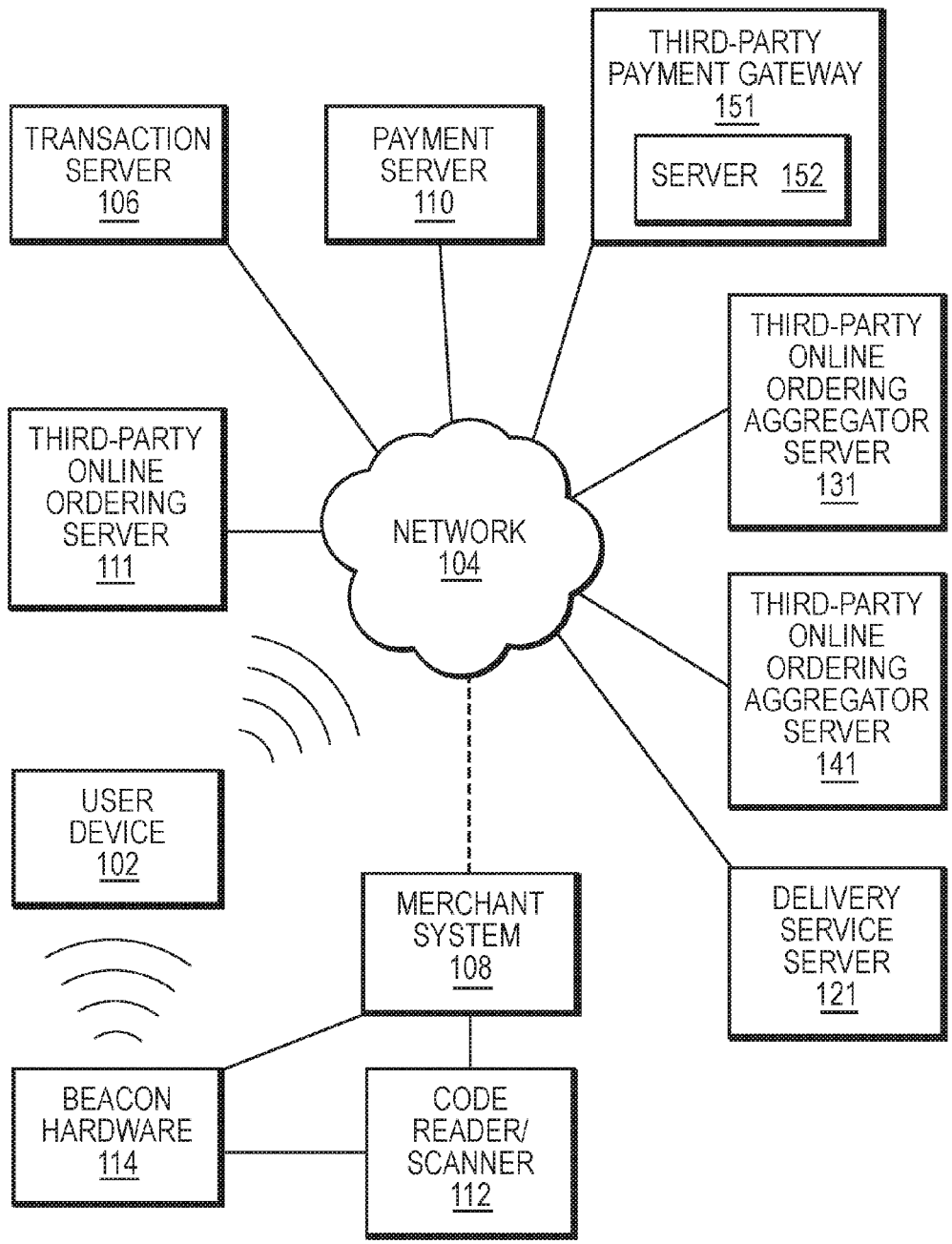
FIG. 1 is a block diagram of an exemplary transaction system and network in accordance with an embodiment of the invention.

Refer first to FIG. 1, which illustrates an exemplary mobile-payment and online ordering transaction system and network 100 that includes user equipment (e.g., a consumer computing device or mobile device) 102 linked to a network 104 (e.g., a cellular telephone network, the Internet, or any wide-area network or combination of networks capable of supporting point-to-point data transfer and communication) of various interconnected devices to support wired, wireless, or any two-way communication. Throughout this disclosure, the term device 102 may be referred to as "mobile device 102" for exemplary purposes, but such references are not meant to preclude the use of any consumer computing device as the device 102. The network 104 connects various devices, including a transaction server 106, one or more merchant systems (e.g., POS terminals or online POS portals) 108 and related components, a payment server 110, one or more third-party online ordering servers 111, one or more delivery providers 121, one or more third-party online ordering aggregator services 131, 141, and a third-party payment gateway 151 and server 152 associated therewith utilizing, again, wired, wireless, or any two-way communications. For clarity, a distinction is drawn in the figure between the third-party payment processor 151, which may be an account-issuing institution or a payment-processing institution, for example, and the server 152 controlled by this party in processing transactions as herein described. In the ensuing discussion, however, the payment gateway 151 and the server 152 are referred to somewhat interchangeably as the context warrants.

Each merchant system 108 may be associated with a merchant who offers goods or services for sale to the user possessing the device 102. In one embodiment, the merchant system 108 is a POS system (e.g., an electronic cash register) that includes or connects to a code reader or scanner (hereafter "reader") 112 among other components. The merchant system 108 may also include beacon hardware 114, as part of the scanner 112 or as another connected or unconnected device, that transmits a Bluetooth or BLE signal containing an identifier known to the transaction server 106 and associated within the transaction system with the location of merchant system 108. The reader 112, may be capable of reading and/or decoding, for example, a barcode, a radiofrequency identification (RFID) code, or a bar code or "Quick Response" (QR) code, and/or receiving signals, such as NFC signals, Bluetooth signals, BLE signals, iBeacon signals, audio signals, or infrared signals. In addition, the reader 112 may be mobile, or physically associated with the merchant system 108.

The payment server 110 may be operated by a payment-processing entity responsible for authenticating, processing, and/or actually performing the payment transaction. For example, a so-called "direct" payment processor represents the financial-processing backend provider to credit-card issuers and payment services such as PAYPAL. An "indirect" payment processor is an independent entity processing transactions for multiple payment services and maintains its own records and data.

The third-party server 111 may be in communication with the merchant system 108 and/or authorized by the merchant 108 to accept orders on the merchant's behalf. The third-party online ordering aggregator services 131, 141 may each have business relationships with the merchant 108 and are authorized to accept online orders on behalf of the merchant. In one implementation, the merchant 108 and/or online ordering providers 111, 131, 141 do not offer a delivery service and the transaction server 106 may communicate with a server of the delivery provider 121 to arrange delivery of the items ordered from the merchant 108 to a specified delivery address at a specified time designated by the user.

The third-party payment gateway 151 and associated server 152 process transactions made by the user using the payment instrument registered with transaction server 106 at physical and online points of sale. The transaction server 106 may be configured to communicate via secure application programming interfaces to the server 152 of third-party payment gateway 151, such as a bank server, information concerning the payment instrument registered by the user with the transaction system 106, and to receive in response information concerning the locations (either by address or by latitude/longitude data obtained via a POS system 108), merchants, amounts, and/or items associated with transactions by the user using that payment instrument or account as further described below.

Figure 2A:
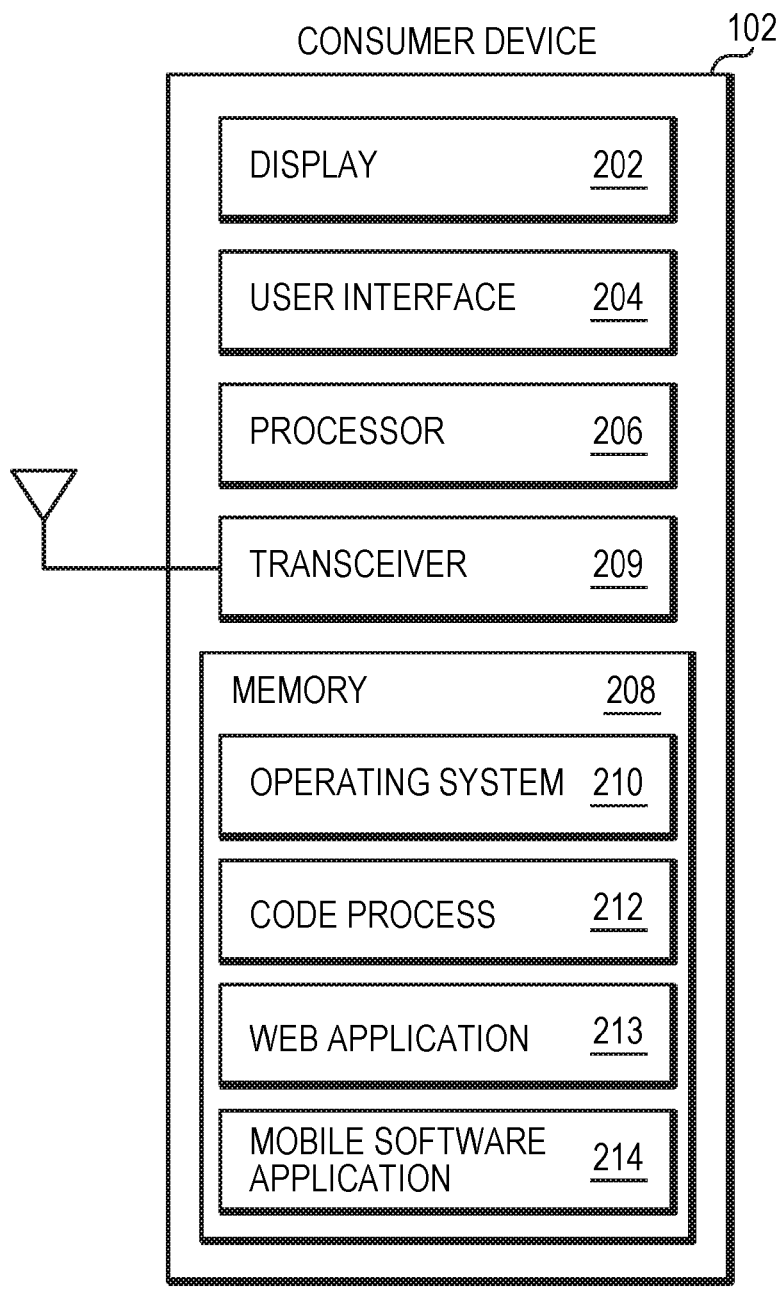
FIGS. 2A and 2B are block diagrams of an exemplary mobile device and transaction server, respectively, in accordance with an embodiment of the invention.

Referring to FIG. 2A, in various embodiments, a mobile device 102 includes a conventional display 202, a user interface 204, a processor 206, a memory 208, and one or more transmitter/receivers 209 capable of transmitting and/or receiving signals such as cellular signals, wireless signals, radiofrequency signals, NFC signals, Bluetooth signals, BLE signals, iBeacon signals, audio signals, or infrared signals. In addition, the mobile device 102 may include a web application 213 and a mobile software application 214 that are proprietary and/or branded specifically to a retail merchant for placing an online order, and/or allow the user to initiate an online order and a payment transaction at a number of unaffiliated retail food merchants through the system as further described below. In various embodiments, these applications 213 and/or 214 may display available items or menu information for one or more retail merchants from which the user may initiate an order and payment transaction directly from mobile device 102 in communication directly with transaction server 106.

The memory 208 includes an operating system (OS) 210, such as GOOGLE ANDROID, NOKIA SYMBIAN, BLACKBERRY RIM or MICROSOFT WINDOWS MOBILE, and a code process 212 that implements the device-side functions as further described below. A mobile device 102 alone may not require a network to be used in the context of the present invention. In addition, additional transactional information may be embedded in the code process 212 for transmission through the network 104 for later processing on a back-end server (e.g., the payment server 110). As used herein, the term "mobile device" used for transacting a mobile payment refers to a "smart phone" or tablet with advanced computing ability that, generally, facilitates bi-directional communication and data transfer using a mobile telecommunication network, and is capable of executing locally stored applications and/or payment transactions. Mobile devices include, for example, IPHONES (available from Apple Inc., Cupertino, Calif.), BLACKBERRY devices (available from Research in Motion, Waterloo, Ontario, Canada), or any smart phones equipped with the ANDROID platform (available from Google Inc., Mountain View, Calif.), tablets, such as the IPAD and KINDLE FIRE, and personal digital assistants (PDAs). Alternatively, as explained above, the consumer device 102 may be another type of consumer computing device, such as a desktop, laptop, or tablet computer executing web-browsing software 213, 214 and having user interface 204, processor 206, memory 208, and transmitter/receiver components 209 similar to and/or corresponding to those components illustrated in FIG. 2A with respect to a mobile device 102. More generally, a telecommunication network refers to any wide-area network, such as the Internet, and may or may not utilize the public telecommunications infrastructure.

Figure 2B:
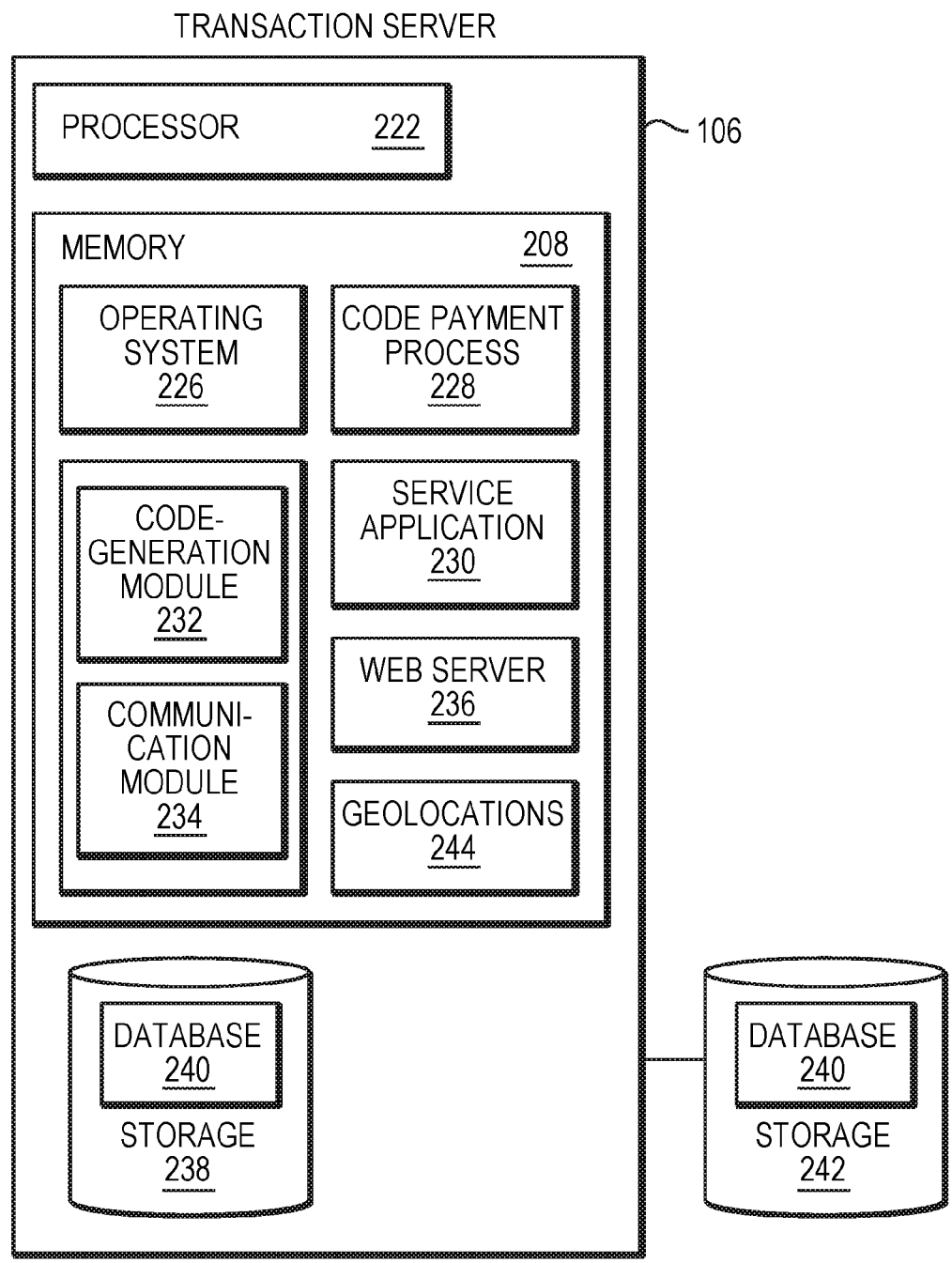

Referring to FIG. 2B, in some embodiments, the transaction server 106 includes a processor 222, a memory 224 having an operating system 226, a code payment process 228, a service application 230, a web-server block 236, and a storage device 238. The code payment process 228 implements the server-side functions of facilitating secure mobile payments as further described below and in issued patents and published applications assigned to SCVGNR, Inc. d/b/a LevelUp, including, for example, U.S. Pat. Nos. 8,639,619, 8,694,438, and 8,838,501, which are incorporated by reference herein in their entireties. The service application 230, integrating a code-generation module 232 with a communication module 234, generates a unique user identifier and communication with a consumer device 102, such as a mobile device. More specifically, the code-generation module 232 may generate a unique code tied to the information received from the user via the communication module 234; the generated code may then be transmitted back to the consumer device or mobile device 102 via the communication module 234. The code-generation module 232 functions similarly to a conventional code-generator that converts the input information into a form that can be readily read or executed by a machine. The communication module 234 may be a conventional component (e.g., a network interface or transceiver) designed to provide communications with a network, such as the Internet and/or any other land-based or wireless telecommunications network or system, and, through the network, with a consumer's device 102. To enable the handling of requests from the mobile device 102, the memory 224 contains a web-server block 236, which can be a conventional web server application executed by the processor 222.

The transaction server 106 may include a database 240 that resides in the storage device 238 and/or an external mass-storage device 242 accessible to the transaction server 106. The database 240 includes user, merchant, third-party online ordering service, third-party online ordering aggregator service, and delivery service partitions (or separate databases). The user database stores, for example, a record of each registered user and payment information for the user, e.g., a code, signal and/or a token associated with each user record. The readable code may be a mature code (e.g., displayable as a QR code or a bar code), a seed code that can generate a mature code later, or an authentication token. In one embodiment, the readable code is unchangeable. In another embodiment, the readable code is reset periodically (e.g., in a predetermined period of time), or upon request or manual intervention, for security purposes or upon receiving a request from the user. The merchant partition (or database) may include records each specifying a merchant, goods sold by the merchant, a geolocation of and, as described below, a current wait time for order preparation received from the POS system of the specified merchant (or from a web server via a script, or from an ordering server via an API call that allows the transaction server 106 to receive wait-time data). Likewise, the partitions (or databases) of the third-party online ordering service, third-party online ordering aggregator service, and delivery service may include records specifying third-parties authorized by the merchant to accept orders on the merchant's behalf, third-party online ordering aggregator services having business relationships with various merchants and authorized to accept online orders on behalf of the merchant, and delivery providers, respectively.

The server 106 also includes a geolocation application 244. As used herein, the term "geolocation" refers generally to an approximate terrestrial location, whether expressed in terms of GPS coordinates, a cellular location, an address, etc. As explained in greater detail below, geolocation application 244 computes expected travel times between a user geolocation and a merchant's order pickup site. Geolocation application 244 may communicate with third-party mapping and/or traffic-monitoring services in computing travel times.

Figure 3:
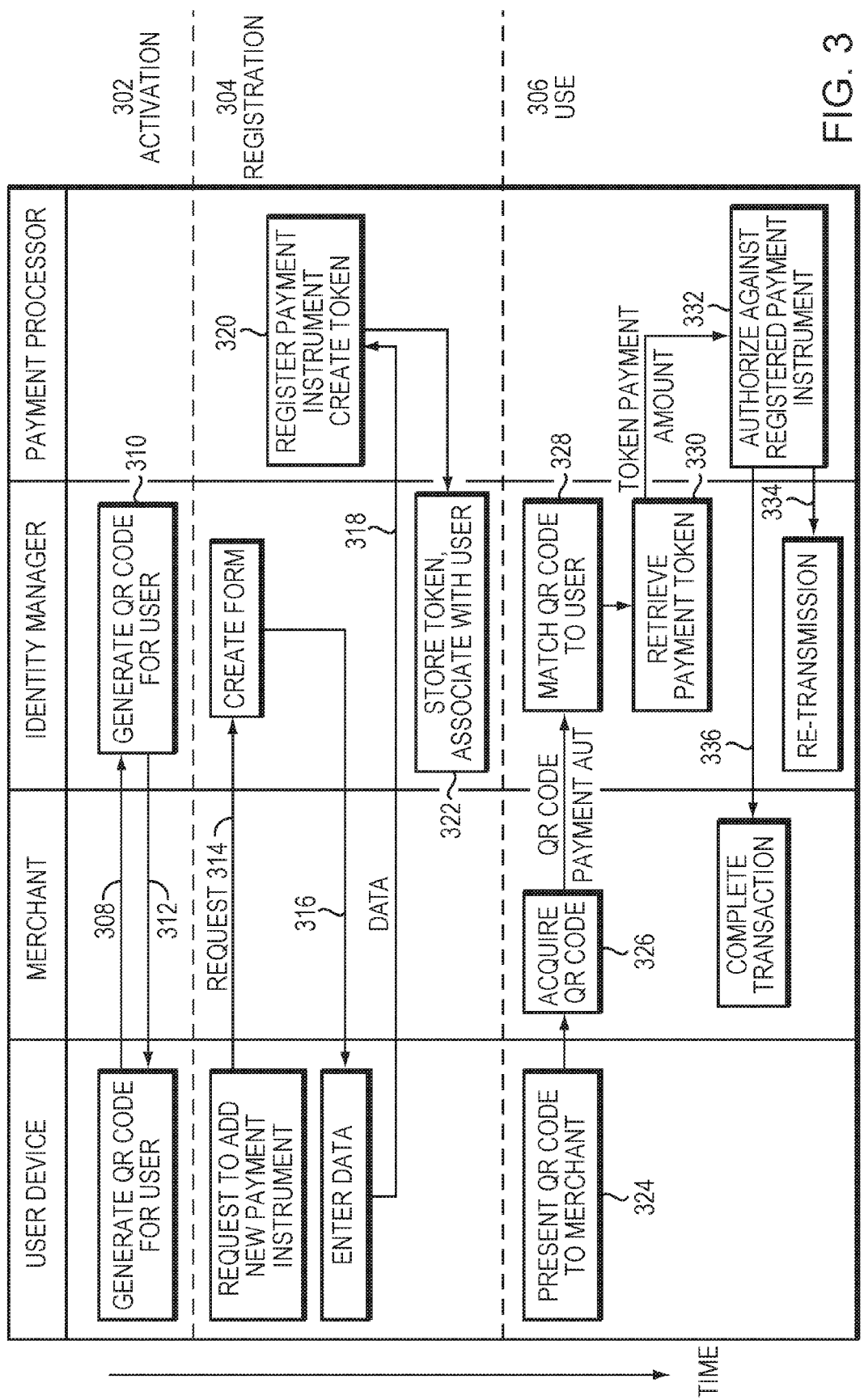
FIG. 3 depicts a workflow diagram illustrating performance of secure payment transactions in accordance with various embodiments of the invention.

With reference to FIGS. 1, 2B and 3, in various embodiments, payment transactions in accordance herewith include or consist of three phases: an activation phase 302, a registration phase 304, and a use phase 306. In the activation phase, a user U first provides identifying information, which may include some addressable information of the user, such as an email address, IP address, device identifier, phone number, or the like, to the transaction server 106 using, for example, a mobile device 102 (step 308). The code-generation module 232 of the transaction server 106 then generates a unique user identifier tied to an account created for the user U (step 310); the user's account, in turn, may be represented by a record in a user database 240 maintained by the transaction server 106. The user record includes, for example, the transmitted user information and/or generated user identifier, as well as other information (name, address, wireless phone number, or any information listed in FIGS. 4A-4C) uniquely identifying the user; the user record may be part of, or include a pointer to, the user's financial account information. In some embodiments, the unique user identifier is a seed code utilized to generate a unique mature code (e.g., a QR code or other codes) that can be captured by, for example, a merchant's POS terminal 108. In one embodiment, the generated unique mature code is stored in the database 240 and successively transmitted to the user's mobile device 102 via, for example, wireless cell phone communication, ultrasound, Bluetooth, near-field communication, Internet, or a mobile application (step 312). In another embodiment, the unique mature code is directly sent to the mobile device 102 without being stored in the database 240. This unique mature code may be later presented to the merchant system 108 when the user U purchases goods or services, as further described below. Because the mature QR code maps to the user's identity information stored in the database 240 only and contains no information about any user's payment tokens (e.g., credit or debit card information) or payment instrument data, hacking the web server 236 of the transaction server 106 alone cannot provide sufficient information to conduct a fraudulent payment. Additionally, the unique identifier may be used as a seed to generate a multitude of QR codes all of which can be decoded back to a single unique QR code, allowing for new QR codes to be generated and pushed to the mobile device 102 on a periodic, per-transaction or time-out basis; the same key, generated with respect to the unique QR code, can be used to validate any of these additional QR codes. In addition, the QR code may be reset upon receiving a request from the user, for example, at the beginning of each transaction; this further prevents a fraudulent use of the QR code. Although the discussion herein focuses on QR codes for purposes of illustration, the present invention is not limited to any particular form of code. In addition, any suitable mechanism for representing and transferring the code derived from a seed code may be used. For example, ultrasound, Bluetooth, NFC or other communication media besides visual representation and automated recognition may be used and are within the scope of the current invention.

In the registration phase 304, the user U registers a payment instrument (e.g., a credit card, debit card, a bank account, carrier account, or a pre-loaded payment card or the like) to her user account. In a representative transaction flow, the user U first issues a registration request to the webserver 236 of the transaction server 106 using the mobile or a web application on consumer device 102 (step 314). The transaction server 106 responds to the request with a registration form (e.g., in the form of a web page), which is displayed on the device 102 in a manner that permits the user U to enter information identifying the payment instrument to be registered (step 316). Persons of skill in the art will recognize that this communication from the transaction server 106 can take various forms other than a web form and may, for example, be a form embedded as native content within a mobile app executing on consumer mobile device 102. In one embodiment, the registration form includes a client-side script that directly submits the data entered by the user U to the server 152 of third-party payment gateway 151 in connection with payment server 110 over, for example, a secure sockets layer (SSL) connection (step 318). The user-entered data is stored in or by the server 152 of third-party payment gateway 151, which may also generate a "redirect" uniform resource locator (URL) that includes the Internet address of the transaction server 106 and a token that identifies the payment instrument to the payment server 110, but which does not identify the user U (step 320). When the user submits the entered registration data, the client-side script causes a request for the redirect URL also to be transmitted to the server 152 of third-party payment gateway 151. When the redirect URL arrives at the mobile device 102 and is processed by the user's browser, it redirects the browser back to the webserver 236 without displaying any content, thus creating the impression that the user has never left the management server site. Persons of skill in the art will recognize that the communication of payment-instrument information from the mobile device 102 to the payment server 110 and/or server 152 of third-party payment gateway 151 may take other forms to achieve the purposes of the invention, such as a communication of payment instrument information from the device 102 directly to the payment server 110 and/or server 152 of third-party payment gateway 151 along with a code or token provided to the device 102 by the transaction server 106.

In another representative transaction flow, the user U transmits information about the payment instrument to the transaction server 106 using the mobile device 102. The webserver 236 encrypts the received information with a one-way key and passes the encrypted data to the server 152 of third-party payment gateway 151. The information may also be encrypted with a one-way key at the consumer device 102 before passing the information to the webserver 236. The third-party payment gateway 151, which is the only party having the key to decrypt the data in the transaction, generates a token that identifies the registered payment instrument. The generated token is transmitted back to the transaction server 106 and stored therein for transacting future payments. Because the data including a user's identity and payment instrument are separately stored in the transaction server 106 and the server 152 of third-party payment gateway 151, respectively, unauthorized access to any one of the records therein is insufficient to initiate a payment transaction under the user's name; this, again, ensures the security of the mobile payment. Persons of skill in the art would appreciate that combinations and variants of these flows may also be used to convey securely payment instrument or account information to the server 152 of third-party gateway 151 without storage of the information at the transaction server 106.

In various embodiments, the payment instrument token, which may be generated by the server 152 of third-party payment gateway 151 or specified by the transaction server 106, is transmitted to the transaction server 106. The transaction server 106 associates the token with the user's account record and stores it in the database 240 as a payment identifier (step 322). Upon receiving a payment request from the user U, the transaction server 106 uses the stored token to initiate the payment transaction through the third-party payment gateway 151, against the payment instrument previously submitted, without ever having knowledge or possession of the payment-instrument data itself. Since the payment-instrument data is not stored and cannot be obtained by the transaction server 106, this approach, again, prevents fraudulent payments.

In the use phase 306, the transaction server 106 executes the instructions of the code payment process 228 and transmits a code, such as a QR code to the user's mobile device 102 for presentation to a merchant system 108; as noted above, the QR code may be revised periodically for security purposes, and is typically generated using encryption based on user-specific information in the database 240. A payment transaction is initiated when the user presents a code, such as the QR code, stored in the mobile device 102 to the merchant system 108 (step 324). The merchant system 108 may scan the code using, e.g., a POS integrated scanner 112, or may receive the code by other means such as wireless communication over NFC or Bluetooth, and thereupon transmits the scanned or received data along with the payment amount to the transaction server 106 (step 326). Thus, at the time of the payment transaction, neither the merchant 108 nor the user U has access to the underlying payment instrument, the QR code merely identifies the user within the transaction server 106. Further, in the case of a QR code that resets, even an image of the presented QR code may not be used again for future payments (as the user would by then have a new QR code). Alternatively, according to embodiments of the invention described below, the use phase may instead be initiated by the transmission of the QR code data from the mobile device 102 to the transaction server 106 directly, without communication to a merchant system 108, along with order information, for example information concerning items selected by a consumer using a menu interface for a retail merchant displayed within an app executing on device 102.

In various embodiments, upon receiving the QR code and payment amount from the merchant system 108 or directly from device 102, the transaction server 106 decodes the QR code and matches the information therein to the user's record stored in the database 240 (step 328). The system 106 then retrieves the stored payment token associated with the user's account and passes the token and the amount to be charged to a payment server 110 and/or a server 152 of third-party gateway 151 for authorizing a payment (step 330). The third-party payment gateway 151 authorizes and processes (or rejects) the payment request against the payment instrument corresponding to the token, and creates an associated transaction identifier or rejection code (step 332). The created identifier or code may be sent to the webserver 236 for re-transmission to the merchant system 108 (step 334), or may instead be sent directly to the merchant system 108 to complete the transaction (step 336). Where the created identifier is first handled by the transaction server 106 before transmittal to the merchant system 108, the transaction server 106 may generate and provide additional information (e.g., tracking information) to the merchant system 108 to enable a closed-loop environment of consumer information —e.g., effectiveness of advertisement, consumer demographics, and referral information. Again, because none of the user's mobile device 102, the merchant system 108, the transaction server 106, or the third-party gateway 151 possesses both user identity information and the underlying payment instrument, this triple-blind payment system provides high security for the user's identity and privacy; accordingly, the possibility of financial losses for the customer is minimized during an m-payment transaction in accordance herewith.

Following the approval or authorization of a transaction to the consumer's payment instrument by the third-party gateway 151 via payment server 110, the third-party gateway 151 facilitates payment to the appropriate parties. Payment may be made by the third-party gateway 151 to the provider of the transaction server 106, which in turn may make payment to the owner of merchant system 108, who provided the goods and services purchased by the user, or the owner's designee. Alternatively, payment may be made directly by third-party gateway 151 to the merchant owner of system 108, based on information provided by the transaction server 106. Transaction server 106 may deduct fees from the amounts paid to the merchant, may separately bill the merchant for fees, and/or may add fees to the amount charged to the consumer's payment instrument in addition to the amount of the transaction at merchant system 108. The various payments between and among the provider of transaction server 106, the merchant owner of merchant system 108, the third-party gateway 151, and the consumer, may occur at varying times and in varying sequences or orders.

The system described above in the three phases also permits the initiation of a transaction in the use phase by a consumer user of a device 102 that is not physically present at the merchant location of merchant device 108, and therefore is unable to present a code, either by optical scan or other wireless communication, to the merchant device 108 to initiate payment for an order. In this use phase, the transaction server 106 facilitates the creation of an online order by the consumer using the device 102, such as through a web application 213 or through a mobile software application 214 executing on the device. The web application 213 and mobile software application 214 may be applications that are proprietary and/or branded specifically to the retail merchant that will receive the online order, or may provide the ability for the user U to initiate an online order and a payment transaction at a number of unaffiliated retail food merchants through the system as described herein. According to embodiments of the invention described herein, these apps 213 and/or 214 may display available items or menu information for a retail merchant or a plurality of retail merchants from which the user may initiate an order and payment transaction directly from mobile device 102 in communication directly with transaction server 106.

The transaction server 106 may provide content data, such as merchant information, location information, menu or available item information, pricing information, and/or nutritional information, to an app 213 or 214 on the user's device 102 to enable the app to display a listing of merchants 108 near the user U's location, or some other specified location, at which the user U can create an order using the app in communication with the transaction server 106. The list may be classified for display to the user U in a variety of forma, including, for example, by type of goods available, nature of the retail merchant, location, price range, user reviews, popularity, the user's past orders or other user data stored in the transaction server 106 concerning the user, or other criteria stored by or available to the transaction server 106. An exemplary form of merchant listing is depicted in FIGS. 4A-4C.

Figure 4D:
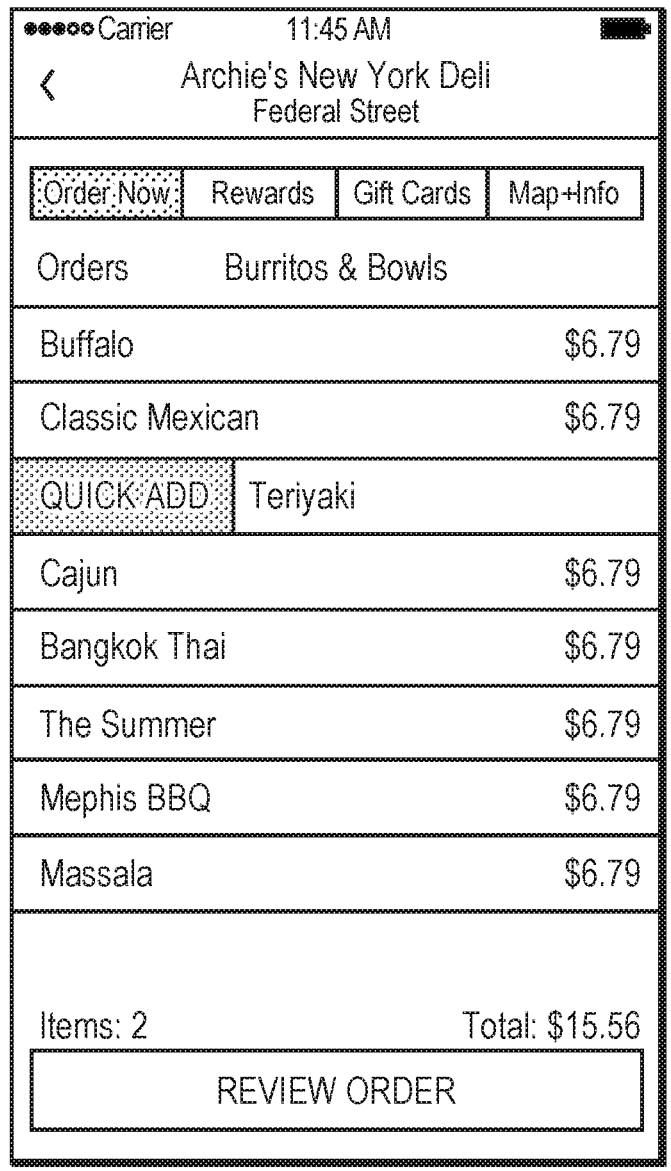
FIG. 4D depicts an exemplary form of item listing within an application of items available at an individual merchant or merchant location according to embodiments of the present invention.

The transaction server 106 may also provide information to an app 213 or 214 identifying menu items and/or items available for purchase or order at each merchant 108, for example, through the use of expanding windows or new windows when the user U selects or clicks on one of the merchants displayed in the list view. An exemplary form of item listing within an individual merchant or merchant location is depicted in FIG. 4D. The transaction system 106 may acquire menu, item, pricing, nutritional, or other information concerning the goods and services offered by a merchant through various forms of communication to servers of the retail merchant or affiliated with the retail merchant that store such information and/or make the information available to consumers via web applications of the merchant or others. For example, menu information for a merchant may be stored on servers of third-party ordering aggregators 131, 141, which work with multiple unaffiliated services, or on servers of a provider 111 of a proprietary, merchant-branded website or ordering mobile app. Information may be obtained by the transaction server 106 through communication to such servers 131, 141, either through publicly accessible APIs or through dedicated communications designed specifically for each third-party and authorized and permitted by such party. Menu information may also be publicly available from a number of public-facing websites.

Figure 5A:
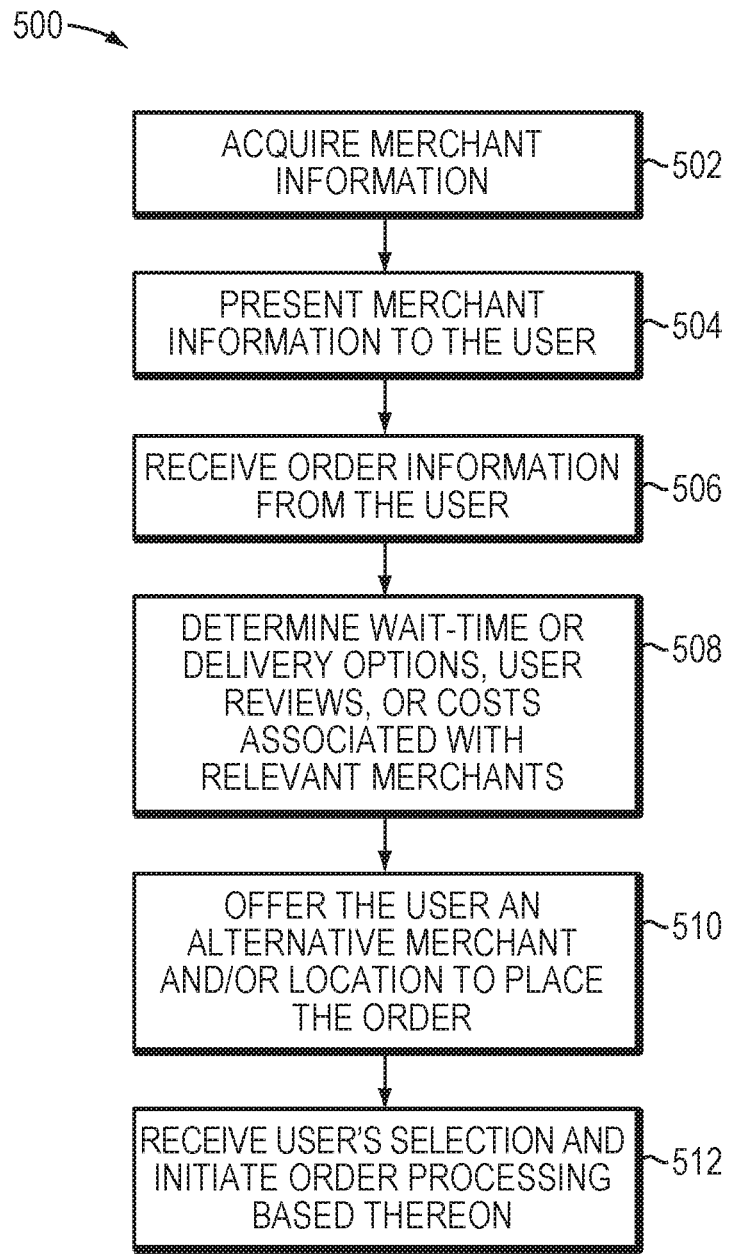
FIG. 5A depicts an approach for providing merchant information to consumers in accordance with various embodiments of the invention.

FIG. 5A is a flow chart 500 illustrating an approach for acquiring merchant information and providing this information to the user in accordance with various embodiments. In a first step 502, the transaction server 106 acquires merchant information (such as a menu) from one or more merchants 108, a third-party ordering server 111 and/or third-party online ordering aggregator services 131, 141. The transaction server 106 may include servers and related processors 222 for parsing, organizing and storing menu information for display to a user through app 213 or 214 in a tiered or hierarchical structure so as to provide a consistent user experience irrespective of the source and format of the menu information (in a second step 504). For example, transaction server 106 may organize menu information by category (such as "Salads"), items (such as "Greek Salad"), option groups (such as "Meats"), and options (such as "Chicken"). Each tier of information may be expandable or collapsible by a user to provide an efficient selection experience. For menu items among a merchant's available items that have customizable features or ingredients (such as size, flavor, or additions like toppings, cheese, guacamole, etc.) each such item in the displayed menu hierarchy structure within app 213 or 214 may be presented by the transaction server 106 with a "quick-add" configuration or combination that sets a default option for all available additions (such as with cheese and guacamole but no tomatoes). For example, an item selection may include a chicken burrito, that enables the user, by selecting such item, to customize the ingredients added to the burrito (e.g., mild salsa, guacamole). Alternatively, the user may select a "quick-add" button or take similar action to add the burrito with standard additions (such as with medium salsa and sour cream) without having to select individual additions. This quick-add configuration for each item can be determined by the transaction system 106 based on the most popular configuration for that item ordered by the same user or different users of the transaction server 106, and can be updated over time as preferences change. Alternatively, the quick-add configuration can be set by a user from within app 213 or 214, or set by a merchant in communication with transaction server 106 based on the merchant's preferred configuration for the item. The user's selection may then be transmitted to the transaction server 106 for processing the order (in a third step 506). Optionally, after the user has completed an order, the transaction server 106 may determine wait-time or delivery options, user reviews, or costs associated with relevant merchants (in a fourth step 508) and offer this information to the user U, through app 213 or 214 on device 102, to select an alternative location as explained further herein (in a fifth step 510). Upon receiving the user's selection, the transaction server 106 may begin processing the order (in a sixth step 512).

One-Touch Ordering

Figure 5B:
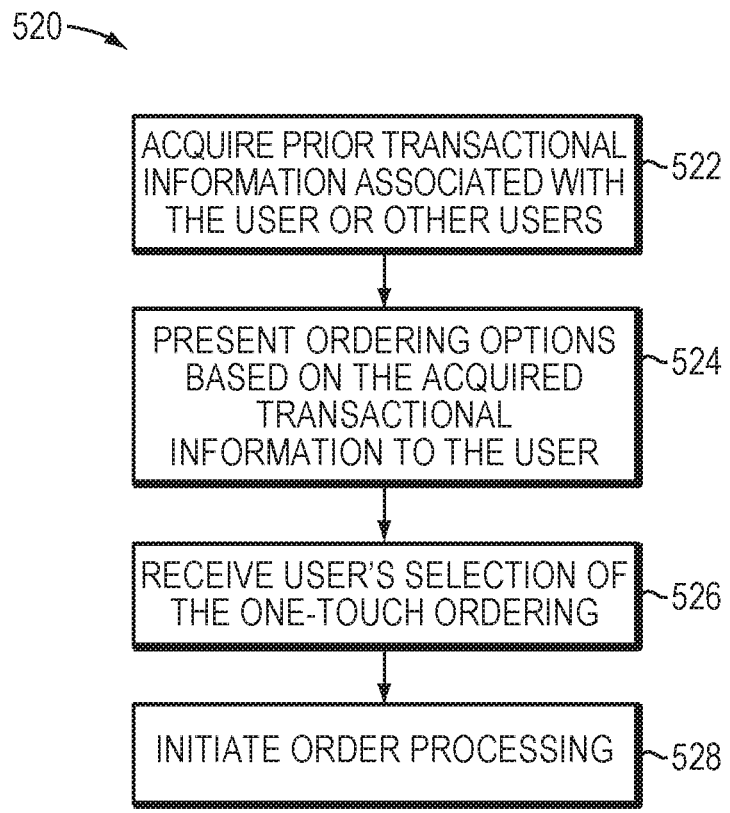
FIG. 5B depicts an approach for providing one-touch ordering to consumers in accordance with various embodiments of the invention.

FIG. 5B is a flow chart 520 illustrating an approach for providing one-touch ordering to the user in accordance with various embodiments of the invention. In a first step 522, the transaction server 106 acquires information and data from usage of apps 213 and 214, and/or from servers 152 of third parties 151 concerning the use of payment instruments registered with transaction server 106. In a second step 524, the transaction system can present to the user ordering options within each merchant that are tailored to the user's preferences and/or past activity, in addition to a standard display of all menu items. The transaction server 106 can cause a user's favorite and/or most recent orders (for example, over the past ninety days, or as designated as a favorite by the user via the apps 213, 214) to be displayed as buttons within app 213 or 214 that will trigger the order with one click or touch. These favorites for one-touch ordering can be displayed as items specific to a selected merchant, or as global favorites displayed to the user with a one-touch order button prior to a selection of a merchant, for example, in a "past orders" list above a listing of available merchants. Alternatively, the user U can be provided with the opportunity to select manually from a list of recent orders, or to construct an order, and save the order as a favorite to be displayed as a one-touch order option button within app 213 or 214 until the user chooses to delete the option. Alternatively, the transaction system 106 may convey information to device 102 for display to a user within app 213 or 214 that include suggestions of items that the user might want to order but has not ordered before, either within an individual merchant display of available items, or as a global suggestion prior to the user's selection of a merchant. The transaction server 106 determines items to present to a user U within app 213 or 214 based on correlation of transaction data concerning purchases by other users of the transaction server 106 that have purchased item(s) similar to the user U. These suggested items may also be presented in connection with an option button permitting the user U to initiate a one-touch order by clicking or selecting the option. Upon selection of the one-touch option, the app 213 or 214 signals the transaction server 106 to initiate an order for the user (in a third step 526), and the transaction server causes the transaction to be consummated, e.g., using stored payment information for the user and the merchant (in a fourth step 528). In various embodiments, the transaction server 106 does not transmit user payment information to a merchant. Instead, in the manner of a credit-card payment, the server 106 may simply inform the merchant that the order has been paid for, following which payment is transmitted to the merchant; or the transaction server 106 can itself pay the merchant using a credit card and charge the user's payment instrument on file.

The transaction server 106 may also be configured to convey additional information to the device 102 for display within the app 213 or 214 concerning each merchant, such as user reviews, popular items, alternative locations, nutritional information, or current wait times at the merchant for fulfilling an order placed in store. Alternatively, any or all of the above content or other content may be embedded natively within, or displayed as embedded web display within, an app branded for or proprietary to the merchant that will receive the order.

Wait Time/Line Time Estimation

Figure 5C:
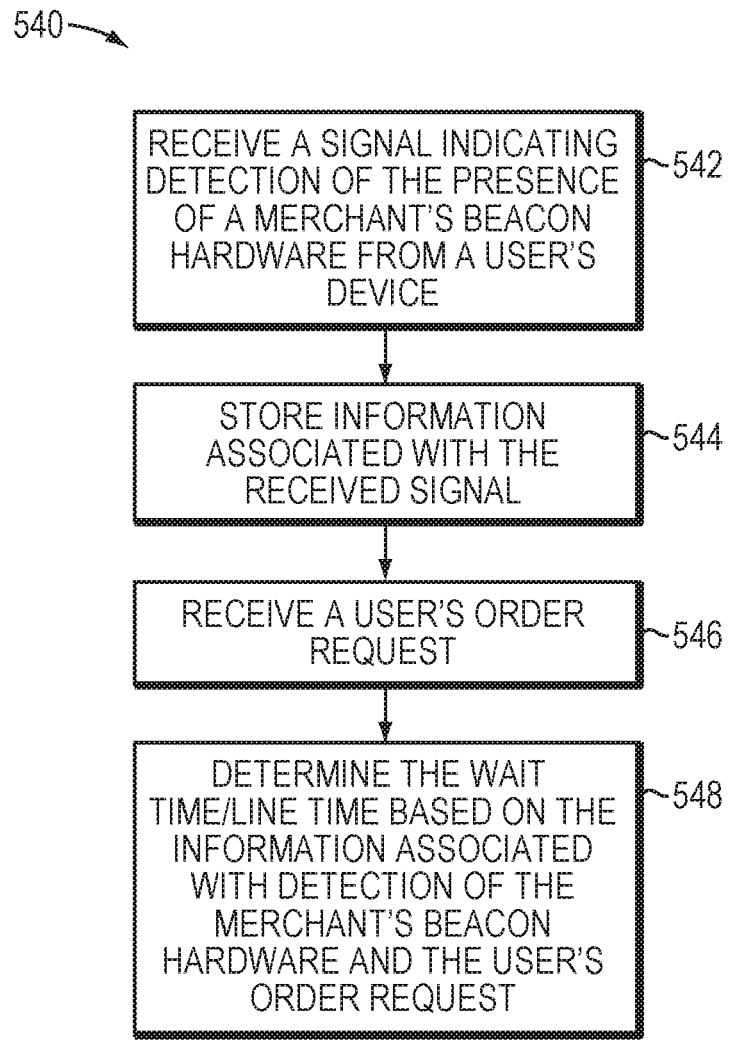
FIG. 5C depicts a flow chart illustrating an approach for estimating the wait time or line time in a merchant location in accordance with various embodiments of the invention.

The transaction server 106 is configured to integrate with the beacon hardware 114 located at merchant locations that broadcast a Bluetooth or BLE or similar signal detectable by the consumer devices 102 executing apps 214 in communication with the transaction server 106. The beacon hardware 114 may include transmitters that may be placed as stand-alone hardware at a merchant location, or may be connected to or fully integrated with hardware that is part of the merchant system 108. Each transmitter broadcasts a signal including at least an identifier code, which has previously been registered with the transaction server 106 and associated with the physical location in which the transmitter 114 is located. FIG. 5C is a flow chart 540 illustrating an approach for estimating the wait time or line time in a merchant location in accordance with various embodiments of the invention. In a first step 542, when a consumer device 102 executing an app 214 detects the presence of a signal (such as a Bluetooth or BLE signal) from the transmitter 114, the device 102 communicates the received identifier code and the user identification token information to the transaction server 106. This "check-in" information received by the transaction server 106 from the device 102, including the time of the communication from the device 102, is stored in the transaction server 106 and associated with the identifier of the user U (in a second step 544). When the user presents the user identifier to the merchant POS system 108 to initiate payment for an order placed at the POS, for example, by presenting a QR code or bar code to an optical scanner 112, the transaction server 106 receives the communication of the user identification and order information from the POS system 108 and stores the information in association with the user identifier, including the time that the communication was received from the POS system 108 (in a third step 546). The transaction server 106 is able to compare the time between the user U's first "check in" at the transmitter 114 located at the merchant's location and the time of the order to determine how long the user U waited at the merchant location before placing the order (in a fourth step 548). By comparing data from several users over a set time interval, the transaction server 106 is able to determine the average "wait time" or "line time" between the time that a user enters the location and the time the user is able to initiate payment for a placed order (in a fifth step 550). As noted above, this wait time or line time information can be displayed in connection with merchant availability or merchant selection option information displayed within app 213 or 214.

In the online ordering use phase, the user U uses app 213 or 214 on the device 102 to select an item or items to be ordered and the device 102 transmits the order information, including the items ordered and the identification of the merchant and merchant location from which the items are ordered, along with the user's code assigned by the transaction server 106 or another identifier of the registered user, to the transaction server 106. Alternatively, if the user is at the physical location of a merchant using an app on a mobile device 102, the app on the mobile device may be configured to convey the order information to the transaction server 106 by encoding such information, for example, within a QR code to be displayed on the display of device 102 or as a code to be transmitted to the merchant POS system 108 via NFC or similar protocol communication, and transmitting the information to the merchant system 108 for communication to transaction server 106, if the device is incapable of connecting via network directly to transaction server 106.

Because the transaction server 106 receives the user token assigned to the user by the transaction system (or other identifier) in connection with the user U's order transmitted from the device 102 to the transaction server 106, the transaction server 106 stores the transaction data communicated as part of the order with a relational association to the stored data concerning the user U in the database 240. The transaction system can therefore correlate the user's purchasing activity through online orders via the transaction server 106 with the user's prior and future purchasing activity at the merchant's physical POS locations, as well as the physical and online POS locations of other merchants, where a system-assigned code or token is conveyed by a user device 102 to a merchant device 108. In this way, the transaction server 106 can identify popular items purchased by a given user across merchants. These "favorite" items for the user U can be displayed to the user in connection with the display of menu information within an app 213 or 214 on device 102 in a priority listing when the user U selects a merchant from which to order.

For example, when a user U makes a selection within app 213 or 214 to explore menu items with a merchant named "Taco Party," the app conveys information concerning the request to the transaction server 106, or may query preference information previously communicated by the server 106 and stored on the device 102 by the app. The transaction server 106 may use the user identifier token associated with the user to identify that user U has previously ordered from Taco Party on three occasions, and on two of those occasions ordered "two chicken tacos with guacamole and extra cheese." In this case, the transaction server 106 may transmit specialized menu information for display within app 213 or 214 that identifies "two chicken tacos with guacamole and extra cheese" as a priority item. That item may be displayed first within the display of menu information, and/or may be set off as a distinct option under a heading indicating that the item(s) is the user's "favorites," "regular orders," or "recent purchases." The system may include the ability for the user to purchase this item, with a set of preconfigured options, immediately, and/or to modify the item or add the item to a larger order.

Order Placed Through Direct Connection to Merchant

Figure 6A:
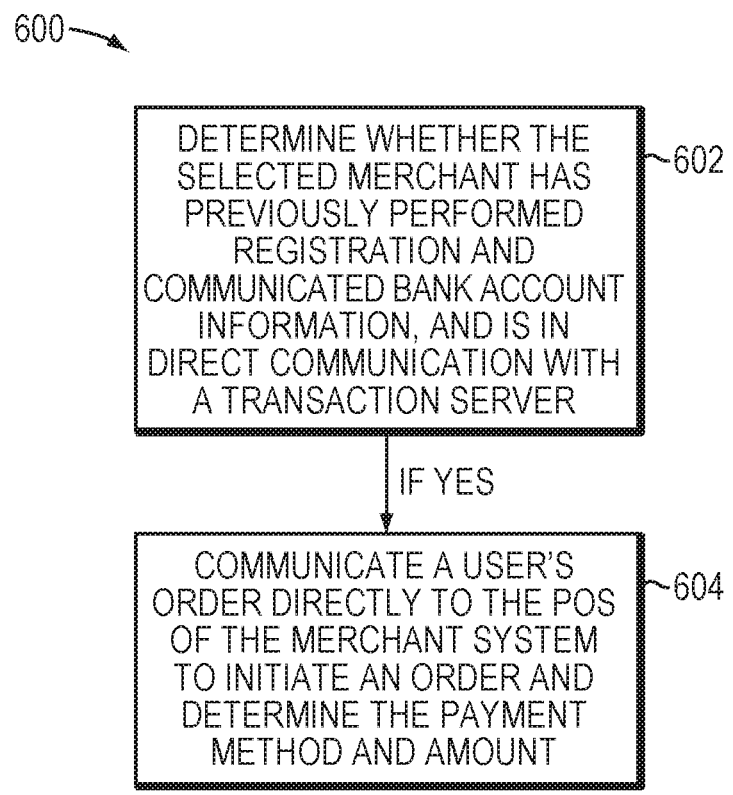
FIGS. 6A-6C depict various approaches for transmitting a consumer's order to a selected merchant in accordance with various embodiments of the present invention.
Figure 6B:
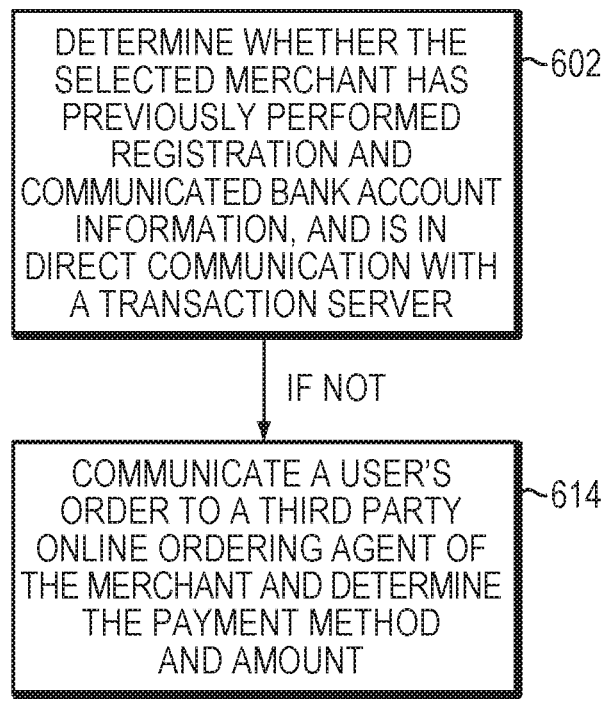
Figure 6C:
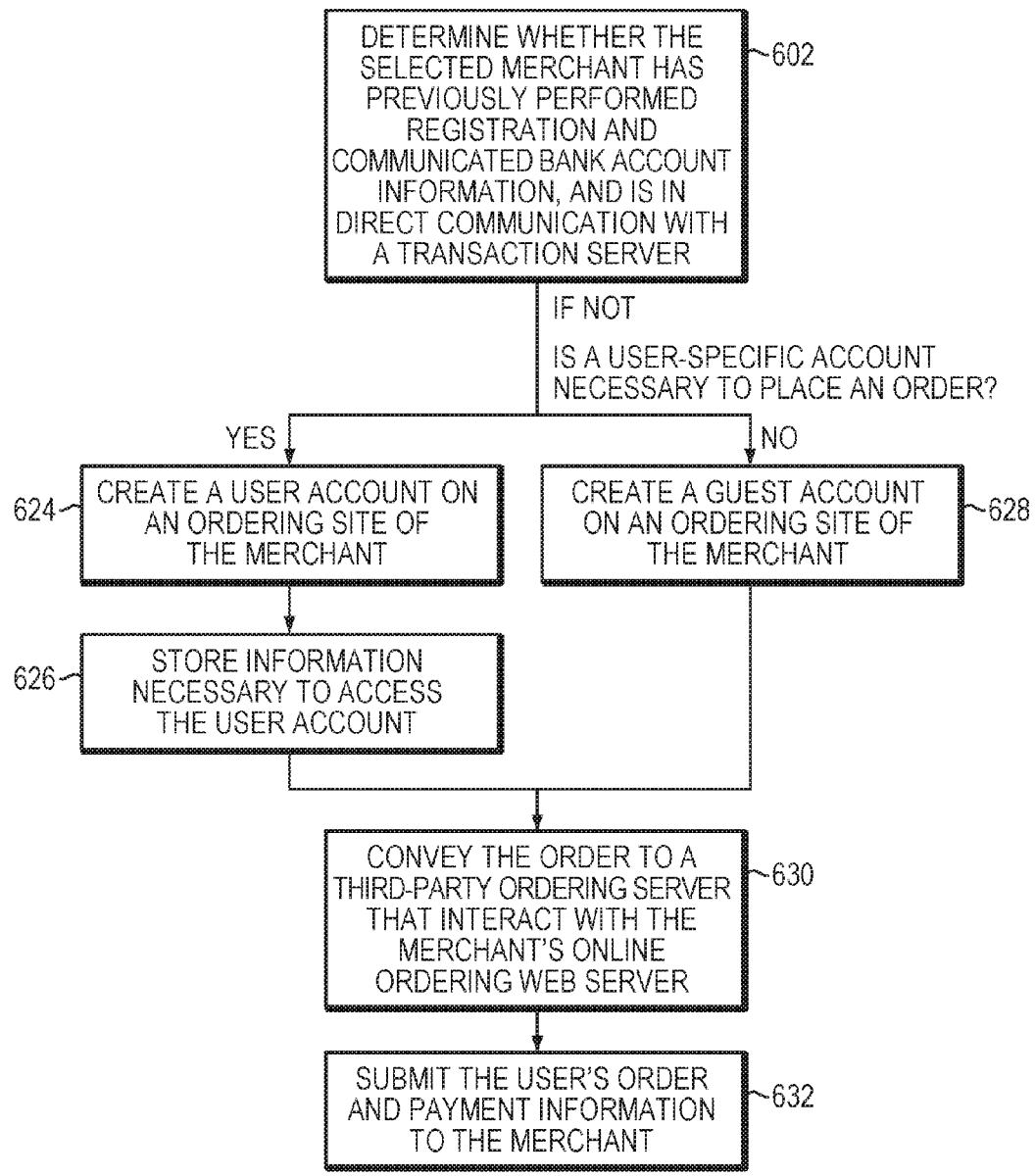

FIGS. 6A-6C depict various approaches for processing the user's order in accordance with various embodiments of the present invention. With reference first to FIG. 6A, upon receiving the user's order, the transaction server 106 first determines whether the merchant selected by the user U is a merchant previously registered therewith, and the merchant has communicated bank account information thereto, and the transaction server 106 is in communication directly with the POS system 108 of the merchant (in a first step 602). If so, the transaction server 106 may communicate the order information to the POS of the merchant system 108 directly, or indirectly through an online ordering provider 111, to initiate an order and determine the payment method and amount (in a second step 604). In this embodiment, the transaction server 106 may inform the merchant that the transaction has been paid for via the user U's registered payment instrument with the transaction server 106. Alternatively, the transaction server 106 may inform the merchant of the total amount and inform the merchant to take payment at the merchant system 108 when the order is picked up. The transaction server 106 may also query the merchant for the applicable tax associated with the total transaction amount prior to finalizing an order, or may calculate the applicable tax directly at the transaction server 106. Further, in this embodiment where the merchant is previously registered with the transaction server 106, the transaction server 106 can automatically apply any discounts or rewards or promotions offered by the merchant through the transaction system prior to creating a charge to the user's payment instrument in connection with the online order. The order information can also be used to determine if the user U earns or qualifies for any additional rewards, such as a loyalty program offered by the merchant or an item-level promotion offered by a third party. The amount of ant discount or reward applied the user's transaction can be deducted when the transaction system initiates payment to a registered bank account of merchant.

Order Placed Through Direct Connection to Online Ordering Provider

Referring to FIG. 6B, if the merchant does not have an established relationship with provider of transaction server 106, and/or if the transaction server 106 is not in direct communication to the merchant system 108 for the purpose of conveying order information to the merchant, the transaction server 106 may communicate the order information received from device 102 to the server of a third party agent of the merchant 111 providing an online ordering service for the merchant, or through an online ordering aggregator 131 or 141 with the ability to convey orders to merchant, where the third-party server 111 is in communication with the merchant system 108 and/or otherwise authorized by the merchant to accept orders on the merchant's behalf (in a step 614). In this case, the third party 111 may provide a branded online ordering portal for the merchant (such as a mobile application or website), or may be an online aggregator 131 or 141 of ordering services for a number of unaffiliated merchants that have contracted with the provider. The transaction server 106 may be configured so that the system communicates with the third-party servers 111 through an authorized interface. In that scenario, the transaction server 106 may communicate order information in a format specified by the third party 111 via direct communication, for example using an API provided and/or published by the third party agent 111. If the merchant has previously registered bank account information with the transaction server 106, the transaction server 106 may also inform the third party 111 that the order has been paid for. The transaction server 106 charges the user U's registered payment instrument through the process described herein for the amount of the transaction as calculated by the transaction server and/or communicated by third party 111, and may transfer the proceeds of the transaction to the merchant and/or to third party 111, after subtracting any applicable fees to the third-party provider, merchant, or user.

No Relationship to Online Ordering Provider

In another embodiment, the transaction server 106 provider may not have any relationship or authorized communication interface with either the merchant system 108 or a third-party online ordering provider 111 that is authorized to act on behalf of the merchant. In this embodiment, the transaction server 106 is able to acquire menu item information from publicly available sources and/or public interfaces to the servers 111 of a third-party provider of the merchant's online ordering service, and/or from web servers of the merchant or the merchant's agents that offer an online ordering service or aggregated online ordering service for the merchant's locations. All such information is available, in a suitable data structure or format, via publicly accessible media selected by the merchant, such as its mobile app or online ordering website. The transaction server 106, in communication with consumer mobile device 102, may display the merchant's locations and the available items and/or menu information for such location in the manner disclosed herein. The transaction server 106, upon receiving an order from the user U via device 102 for selected items at such an unaffiliated merchant, begins the process of placing that order via the merchant's publicly available ordering interfaces. This process may involve a number of steps as depicted in FIG. 6C.

A first such step may be the creation of a user account on the ordering site, using information generated by the server 106 the on behalf of the mobile user U and conveyed via communication network 104 to the server 111 of the third-party ordering provider 111 (in a step 624). Many such ordering sites or applications require the creation of a user account, which can be accomplished programmatically via API or through scripting against the merchant's public web site. The creation of a user account by the transaction server 106 with the ordering server 111 also allows for the transaction server 106 to obtain confirmation of the order, and to allow for tracking and further processing if necessary, including refunds. Upon creation of a such a user account, the information necessary to access that account moving forward (an access token or encrypted username and password generated by the transaction server 106 and communicated to the ordering server 111 at the time of registration) is stored securely within the transaction server 106 (in a step 626). This creation of a temporary profile with information generated and stored in database 240 of the transaction server 106 in association with the profile of the user placing the order permits the transaction server 106 to re-access the order details for that user at servers 111 if necessary. Sometimes, it may not be necessary to create a new profile within the server 111 if orders can be placed as a "guest" account, without the permanent storage of information generated by transaction server 106 and communicated to the ordering server 111. In those cases, all of the information needed to create an order is passed each time by the transaction server 106 to the ordering server 111 (in a step 628). The creation of a user account at ordering server 111 or the use of a guest account also permits the transaction server 106 to receive and track receipts from server 111 confirming orders, such as by email to a one-time-use email address generated by the server 106 for purposes of placing the order. The transaction server 106 may re-use a temporary profile created at the server 111 for future orders by the same user U, but creates new temporary profiles for each instance in which a user transacts at a new merchant or new merchant location. Sometimes it may not be necessary to create new accounts on a per-merchant basis if, for example, a plurality of merchants use the same provider that allows the same account to order at multiple merchants.

Once a user account has been created, a second step is to convey the order information to the third-party ordering server 111 through a publicly accessible API or through scripts executing on server 106 that interact with the merchant's online ordering web server to create the order received from device 102 in the third-party server 111 (step 630). The ability to place items into order is always made publicly available by the merchant either via a mobile application or web interface. This interface may be seamless to the user.

Upon the creation of an order, the final step is to submit the order, along with payment instrument information to the merchant for production and fulfillment of the order and the completion of a payment transaction (step 632). In this embodiment, the transaction server 106 communicates to the third-party server 111 (via the APIs or via scripts interfacing to a web-based ordering solution) a payment instrument, such as a credit card, debit card, or financial account number, issued to the provider of the transaction server 106, and the transaction system account is charged by the merchant for the amount of the purchase or order in the ordinary course. The payment instrument may be a single-use or tokenized credit or account number generated by of for transaction server 106 that can be processed through traditional credit card processing systems. The payment instrument may alternatively be a tokenized form of the payment instrument of the user stored by transaction system 106. This may occur where the payment instrument (a corporate card, for example) is passed into the ordering provider server 111 by the transaction system server 106 along with the order, or the payment instrument information may be added to the user's account with the online ordering provider ahead of time and stored for later utilization. Both of these methods are transparent to the user. With the order configured and the payment instrument added, the relevant transaction-processing actions are taken via communication from transaction server 106 via API to the ordering server 111 or via scripting against the merchant online ordering website to submit the order. In this way, the order placed by the user in an app 213 or 214 executing on device 102 in communication with the transaction server 106 provides the consumer the appearance of a direct ordering connection to a plurality of unaffiliated merchants.

Following the charge by the merchant or server 111 to the payment instrument provided by transaction server 106 to complete the order as described above, the transaction server 106 charges the same amount, or an increased amount including fees to the user, or a decreased amount if any rewards/discounts were applied to the transaction, to the user U's payment instrument registered previously with the transaction server 106 as described above in the registration phase. In this way, the user U is provided with a consistent ordering experience at all merchants when ordering via the transaction system, irrespective of whether the merchant 108 or its online ordering provider 111 has a contractual relationship with provider of transaction server 106.

The transaction server 106, as part of the ordering interface within app 213 or 214, may provide to the user U the option to select that the user will pick up the order or to have the order delivered to an address or location input by the user, communicated by device 102 based on device location functionality, such as GPS, or to a location previously registered with transaction server 106 and stored in the system. If the merchant and/or online ordering provider offers a delivery service, the order communicated by transaction server 106 to the ordering server 111 may further include delivery details provided or obtained from the user U. If the merchant and/or ordering provider do not offer a delivery service, the transaction system may communicate the order to servers 111 as described herein, and arrange separately, for example, through communication to the servers of a delivery service 121, for delivery of the items ordered from the merchant address to the specified delivery address at a specified time.

Figure 7:
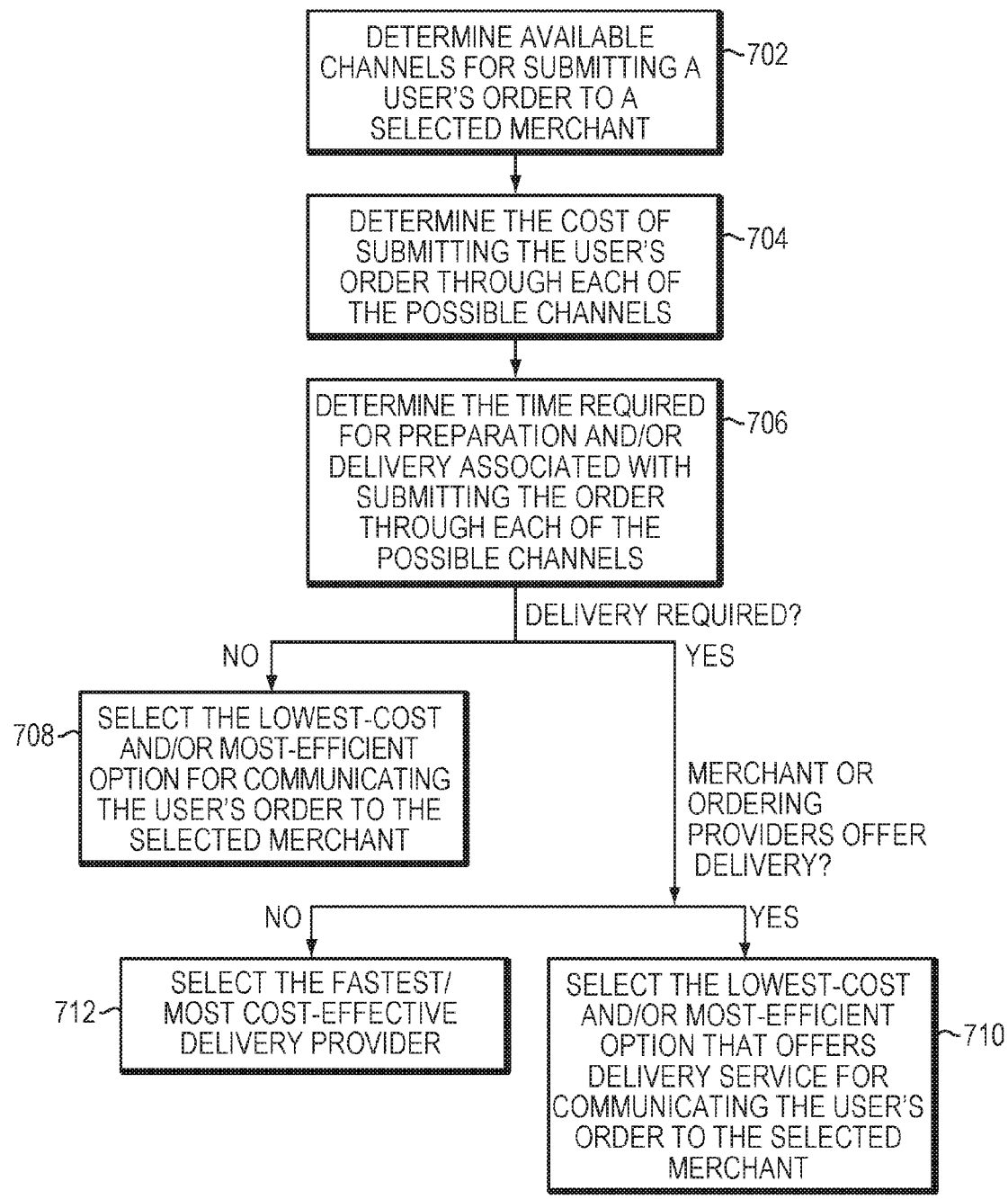
FIG. 7 depicts an approach for selecting a lowest-cost and/or most-efficient method for communicating a consumer's order to a selected merchant in accordance with various embodiments of the present invention.

Referring to FIG. 7, the transaction server 106, upon receiving an order request O from the user U via an app 213 or 214 executing on the device 102, first determines the available channels for submitting the order O to the specified or selected merchant (in a first step 702). For example, in various embodiments, the transaction system 106 may have the option to submit order O from the server 106 via a communications network to a branded online ordering service provided by a third party, via communication to third-party ordering server 111, for the merchant, or to submit order O through two third-party online ordering aggregator services or servers 131 and 141 that each have business relationships with the merchant and are authorized to accept online orders on behalf of the merchant. The transaction server 106 may next determine the cost of submitting order O through each of these three possible channels or servers, either by obtaining in real time from each server 111, 131, and 141 information concerning the cost of the submission of order O, or via information stored at the transaction server 106 concerning the cost of placing an order through each available platform or server (in a second step 704). The transaction server 106 may next determine the time required for preparation and/or delivery associated with submitting order O through each of these three possible channels, through the same processes (in a third step 706). The transaction system can then arbitrate between available ordering providers to select the lowest-cost and/or most-efficient option for communicating the order O to the selected merchant, with efficiency corresponding to speed, reliability, proximity, satisfaction ratings assigned to the merchant by users, total overall cost including tax, or some combination of these or similar parameters (in a fourth step 708). In some embodiments, the user U submitting order O may request that the order be delivered to the user's address input and communicated to the transaction server 106 or previously registered with the transaction system. Using the same methods described above, where the transaction server 106 identifies multiple available providers for the submission of an order O for which either the merchant or ordering providers offer delivery, the system can arbitrate to determine the fastest/most cost-effective ordering provider (in a fifth step 710). These "optimization parameters" can be weighted according to preferences expressed by the user and stored in the user database with the user's record. Alternatively, transaction server 106 may provide the user U the option to choose between multiple available options for placing the order.

Likewise, where the transaction server 106 identifies multiple available providers for the delivery of an order for which neither the merchant or ordering providers offer delivery, the system can arbitrate to determine the fastest/most cost-effective delivery provider 121 (in a sixth step 712). Alternatively, transaction server 106 may offer the user U the option to choose between multiple available options for delivering the order.

Predictive Ordering

Figure 8:
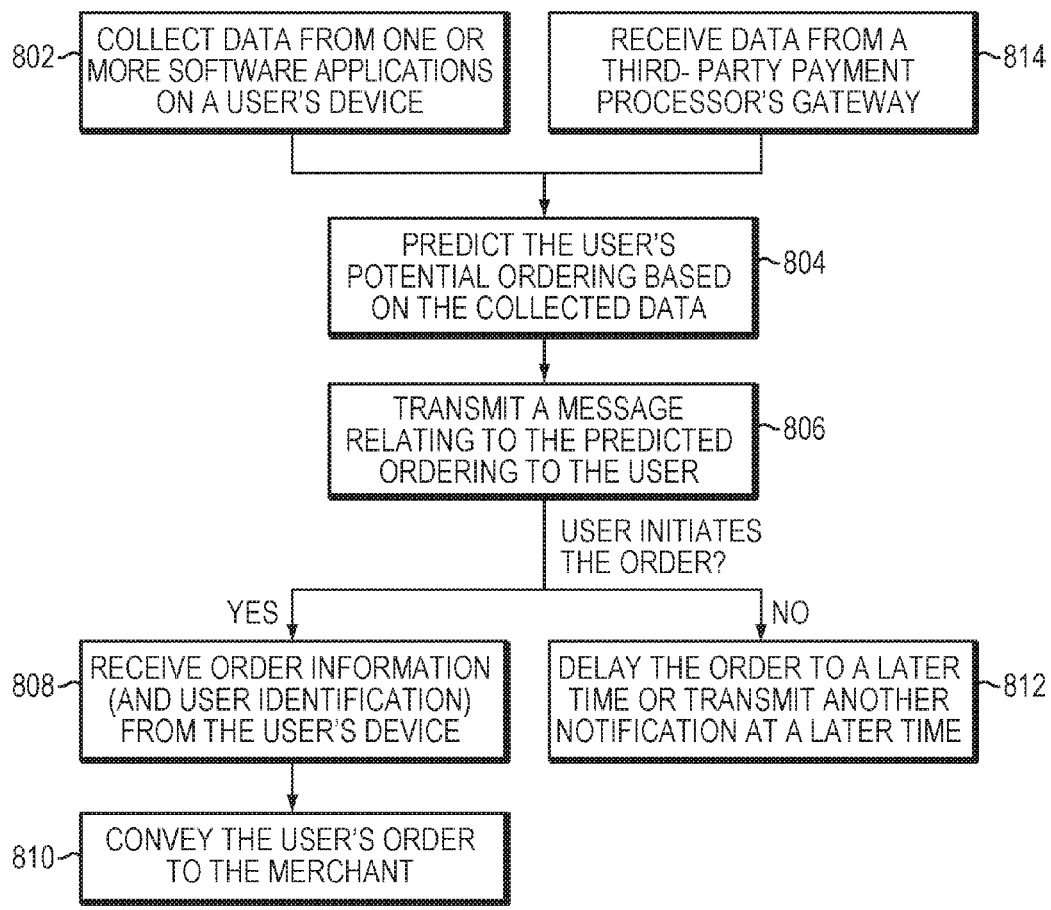
FIG. 8 depicts an approach for offering predictive recommendations to a consumer in accordance with various embodiments of the present invention.

The transaction server 106 may predict the time when the consumer is likely to make a next purchase, the likely location of the purchase, and/or the item(s) that the consumer is likely to purchase. Referring to FIG. 8, the transaction server 106 may collect data from apps 213 and 214 concerning a user's purchasing behavior, including both online orders through the apps 213, 214 and in-store purchases initiated using a consumer device 102 (in a first step 802). The transaction server 106 may predict the user's potential ordering based on the collected data (in a second step 804) and then transmit a message relating to the predicted ordering to the user (in a third step 806). For example, if a user U frequently purchases a regular coffee with milk on Monday mornings at or around 9:15 at Corner Coffee, the transaction server 106 may predict that the user U is likely to make that purchase again the following Monday. In that case, the transaction server 106 sends a message to the app 213 or 214 executing on a user device 102 at 9:00 am that creates a notification to the user inquiring as to whether the user would like coffee with milk to be ready for pickup at Corner Coffee at 9:15 am. The message might say, for example, "Would you like us to have your usual coffee with milk ready for you at Corner Coffee at 9:15?" The message may give the user U the option to click or right-swipe to initiate the offer. In that case, the app 213 or 214 executing on device 102 communicates the order information and user identification token information to the transaction server 106 in the manner described above, but without the user U being required to navigate through merchant selection, menu, and item selection screens (in a fourth step 808). The transaction server 106 then is able to convey the order to the merchant at the appropriate time, and to complete the charge to the user's registered payment instrument, or to apply prepaid value stored in the transaction system 106 for user U, in accordance with the description above (in a fifth step 810). This capability may be combined with the user's location and a predicted time of arrival. For example, if the system predicts that the user U will want her coffee with milk at 9:15, it may deliver the inquiry when the user U is at a location that would result in arrival at Coffee Corner at that time. Similarly, the inquiry may be issued based on the merchant's current line time or backup-delay information received from the merchant, so that if the consumer accepts the solicitation and places the order, it will be ready at the offered time.

Alternatively, if the user U does not wish to have the order ready at 9:15 as offered by app 213 or 214, the app may present the user with options to either "make it now," to delay the order to a later time—either a time specified by the user or a time that is a set time later than the offered time (such as, "make it in 30 minutes")—or the user may request to be notified again in 15 minutes (in which case the transaction server 106 and app 213 or 214 creates a second notification message to the user at 9:15 am asking if the user U would like her coffee ready at 9:30 am) (in a sixth step 812).

In addition to transaction data acquired by the transaction server 106 through in-store and online purchases initiated by the user U using device 102 and app 213 or 214, the transaction server 106 may also be configured to receive data from a server 152 of third-party 151 payment processor's gateway, such as a payment instrument or account-issuing institution or payment-processing institution, concerning transactions made by the user U using the payment instrument registered with transaction server 106 at other physical and online points of sale (in step 814). The transaction server 106 may be configured to communicate via secure application programming interfaces to a server 152 of the third party 151, such as a bank server, information concerning the payment instrument registered by the user U with the transaction system 106, and to receive in response information concerning the locations (either by address or by latitude/longitude data obtained via a POS system 108), merchants, amounts, and/or items associated with transactions by the user U using that payment instrument or account. Such data may be used to improve the predictive ordering capabilities of transaction server 106 as explained above. The transaction server 106 can be configured to normalize data (i.e., identify purchases of the same or similar item across merchants) received from the third party 151 in this manner, including to correlate data concerning purchases at merchants at which user U has also initiated transactions using an app 213 or 214 integrated to the transaction server 106. The transaction server 106 may also organize and categorize data to identify categories of items purchased by user U, such as coffee, or salad, etc. For example, a merchant may report expected preparation time by category—e.g., one minute for coffee and 15 minutes for a sandwich (or "lunch order" or "meal"). That information may be matched with the categories within which user-selected goods fall, so that the expected wait time is reported, for example, as the longest wait time among the goods categories implicated by the user's order. In this way, merchants need not report a unitary wait time (which may be inaccurate) or specific wait times for all goods (which is unrealistic); the category wait time will usually be close enough for practical purposes.

Timed Ordering

Figure 9A:
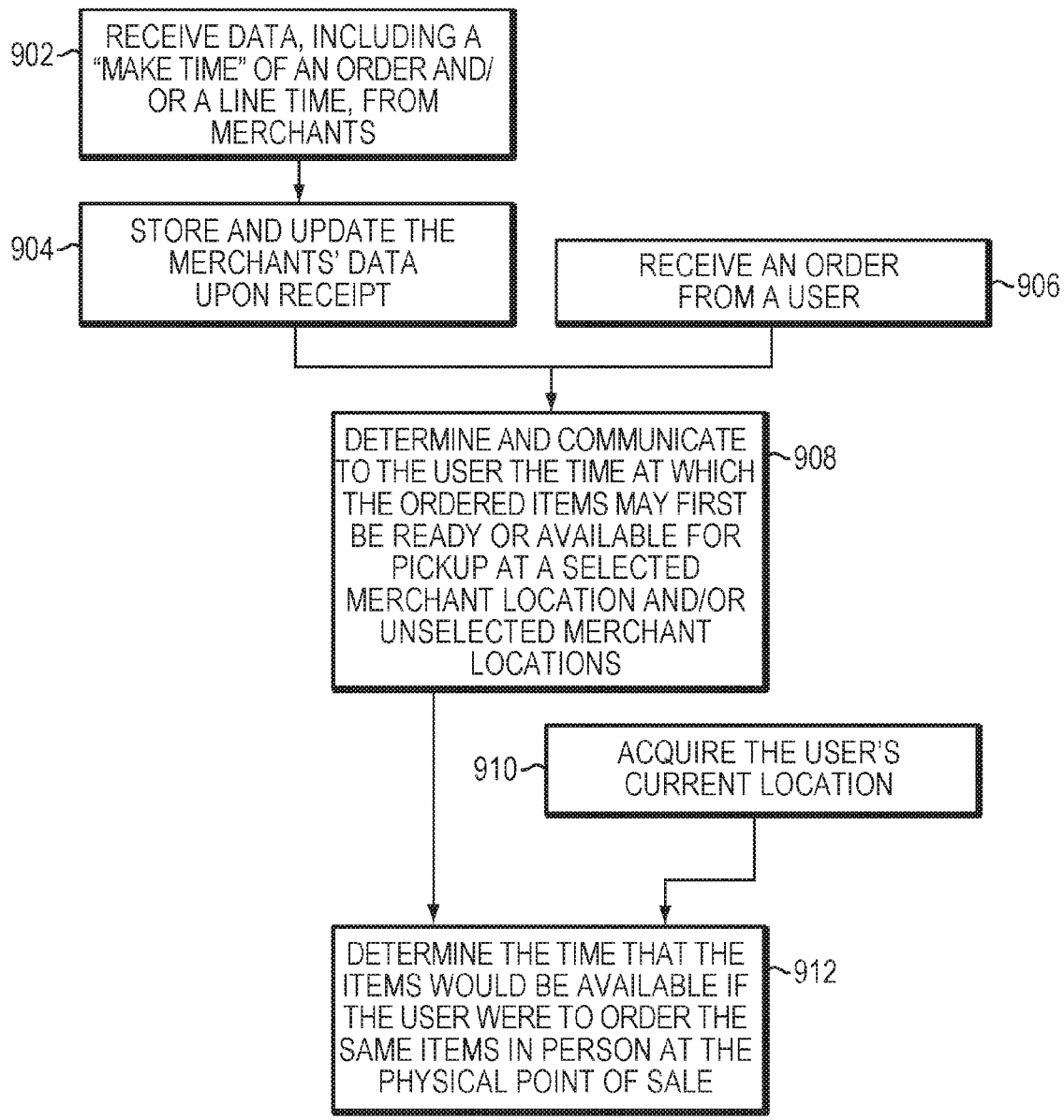
FIG. 9A depicts an approach for providing a consumer with an estimated time when his order may be ready at a selected (or unselected) location in accordance with various embodiments of the present invention.

The transaction server 106 may provide the user with a number of flexible options for picking up an online order placed through the transaction system at a merchant location previously registered with the transaction system. For example, referring to FIG. 9A, the merchant system 108 and/or a device in communication with the system 108 may communicate data to the transaction server 106 on a regular basis, at regular or irregular intervals, indicating the current time required to complete preparation of an order (the "make time") and/or the customer line time, or such data may be provided on an item-by-item or item category basis (step 902). The transaction server 106 stores and updates this information upon receipt (step 904). If the information is stale—e.g., the entry is time-stamped and the timestamp has an age greater than a threshold, e.g., five, 10, or 15 minutes—the transaction server 106 may query the merchant system 108 for an update. When an item or items are selected for ordering by a user U via app 213 or 214 and transmitted to the transaction server 106 (step 906), the transaction system can determine and communicate to the user the time at which the ordered items may first be ready or available for pickup, which may reflect, for example, the greater of the backup delay for order preparation and the line wait time (step 908). The transaction system may also offer the user U the ability to select, via app 213 or 214, any later time to pick up the ordered items.

In connection with the display of the earliest possible pick-up time for the selected items, the transaction server 106 can also determine the time that the items would be available if the user were to order the same items in person at the physical point of sale, accounting for preparation time (including any backup delay, if the merchant makes timely data available) and the line time or wait time at the location selected by the user, and by calculating the time that it would take the user to reach the location based on GPS, geolocation, IP address, or recent beacon "check-in" data provided by the consumer device 102 to the transaction server 106 (and based on a known geolocation of the beacon) (steps 910 and 912). For example, the transaction system may inform the user U through app 213 or 214 that the selected items would be available for pick-up at the selected location in 20 minutes, but that there is only a five-minute line at the location for in-person orders, and the location is only a five-minute walk away. Alternatively, the transaction server 106 may determine based on merchant data stored within the system that the selected items would be available for pickup from another merchant location in only 10 minutes, and that the location is a 5 minute walk away from the user's current location.

The transaction server 106 may also communicate to the user through app 213 or 214 the option to have the order made immediately, rather than waiting the standard "make time" as communicated by the merchant to transaction server 106. In this case, the communication of the order information from transaction server 106 to the selected merchant system 108 can include additional information indicating to the merchant that the order has been prioritized and should be made immediately. The transaction server 106 may be configured to apply an additional fee to reflect the prioritized service when charging the user U's payment instrument in connection with this (or other) requests by the user U. For example, the transaction system may apply a fixed increased fee for make-it-now orders, or may apply a variable fee (or percentage increase or multiplier) determined, for example, based on a communication from the merchant or based on the current make-time as communicated by the merchant.

Have it Ready

Figure 9B:
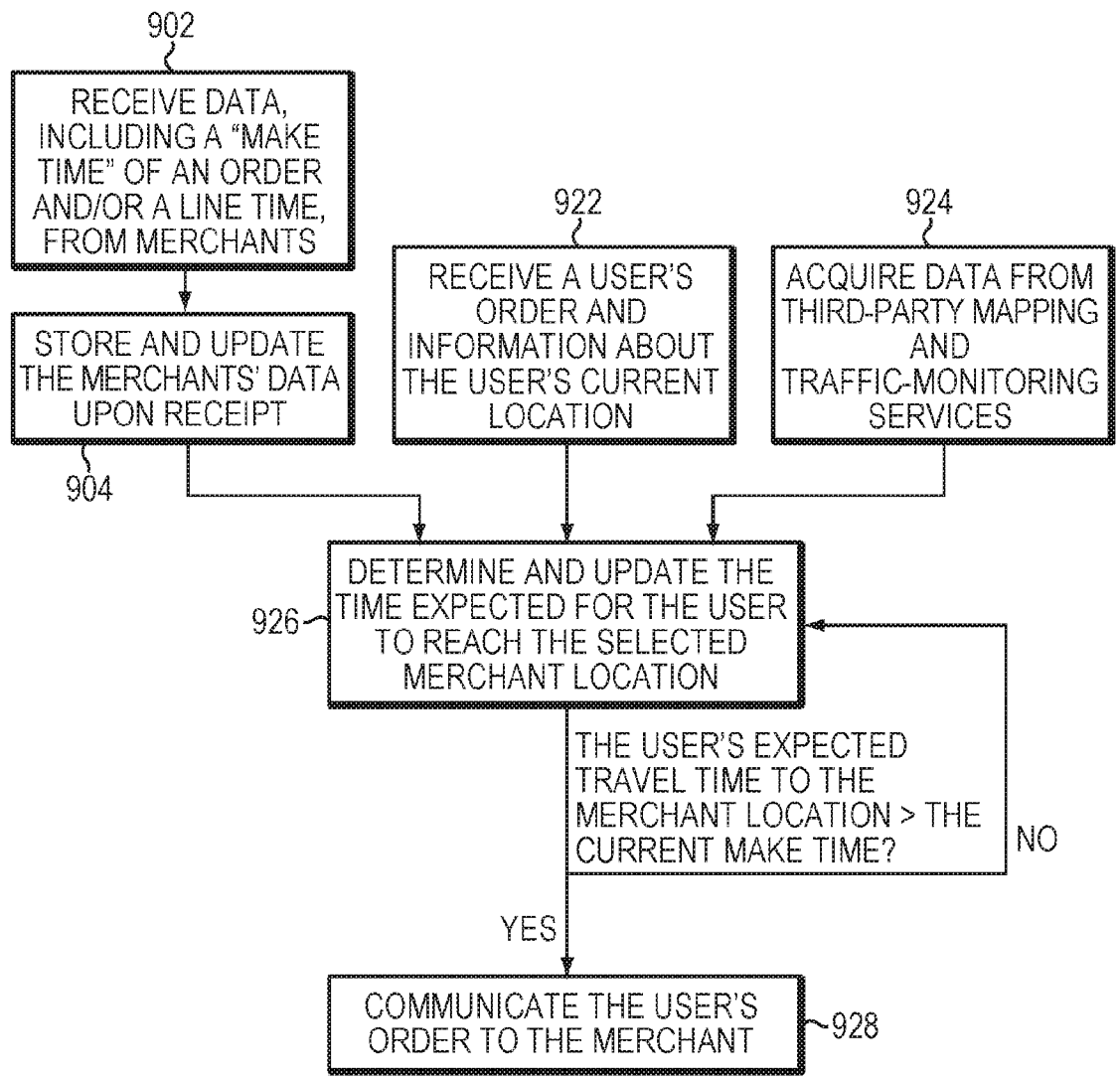
FIG. 9B illustrates an approach for having a consumer's order ready when he arrives at a selected location in accordance with various embodiments of the present invention.

If the transaction server 106 receives information from device 102 indicating that the user U is a sufficient distance away from the selected location at the time of the order, such that the time for user U to reach the location is longer than the time it would take the merchant to have the selected items ready for pick-up (i.e., the time it would take the user U to travel to the merchant location is longer than the make time communicated by the merchant system 108 for the selected items), then the transaction system may offer the user U the option to select within app 213 or 214 to have the order ready for the user when he arrives at the location. Referring to FIG. 9B, the transaction server 106 receives from the device 102 an order and continuous or regularly updated information concerning the location of the user U, including via GPS data from device 102 or through beacon "check-in" communications by device 102 at transmitters 114 associated with transaction server 106 and located at merchant locations other than the merchant at which the order was placed (step 922). Based on this data, and in some implementations using third-party mapping and traffic-monitoring services (step 924), the transaction server 106 can determine and update the time expected for the user to reach the selected merchant location (step 926). When the user's expected travel time to the merchant location equals or exceeds the current "make time" communicated by the merchant to transaction server 106, the system 106 can communicate the order to the merchant as explained above (step 928). For items where the make time is zero or effectively zero (e.g., for coffee), the user's arrival at the merchant location can be used to trigger the communication of the offer to the merchant system 108, for example, as indicated by the communication from the user device 102 of beacon check-in data indicating that the user is in proximity to a transmitter 114 located in or near the merchant location.

In some embodiments, the transaction server 106 may accept a "merchant-agnostic" order from the user and select merchants capable of fulfilling the order. For example, the server 106 may query database 240 to identify merchants offering the ordered goods, their locations, and wait or make times affecting the ordered goods. The transaction server 106 may communicate a list of prospective order-fulfilling merchants and their locations to the user, and may further provide expected travel times to each of the identified merchants—e.g., highlighting the merchant with a wait time most closely matching the expected user travel time. The transaction server places the order after receiving the user's selection of a merchant from among the identified merchants.

Order Tracking

The transaction server 106, according to certain embodiments, may also provide the user U, by communication of information to the user device 102 for display with app 213 or 214, information concerning the status of an order following placement thereof by the user. For example, the transaction server 106 may receive data continuously, regularly, or at less regular intervals from merchant system 108 concerning the order, e.g., how many orders are ahead in line of the user's order, or when the merchant has begun to prepare the user U's order. Such information can be transmitted by the transaction server 106 to the device 102 of the user U upon request from the user, or as messages to app 213 or 214 to be displayed on the device, or by other means provided by the user U such as email, text, or SMS message.

Following the placement of on order by user U via app 213 or 214 on device 102, the app integrated to the transaction server 106 may present to the user an option button to click or select when the user has picked up or received delivery of the placed order. This communication of receipt confirmation by the user U can be communicated to the transaction server 106, and can be used by transaction server 106 to calculate the average make time for items at a location. For example, a user U's ordering an item at 12:00 pm for immediate preparation, and then clicking the confirmation of receipt option button (thereby communicating receipt of an order to transaction server 106) at 12:15, together represent data suggesting a required make time for the item of 15 minutes. The transaction server 106, by storing this data and continually comparing it to other received confirmation communications from other users, can calculate an updated average wait time or make time for selected items at each merchant location. This may be displayed or otherwise communicated to the user U. Alternatively, rather than (or in addition to) requiring a user to select a confirmation button, the transaction server 106 records and stores the last "check-in" by the device 102 at the beacon hardware 114 located at the merchant location where the order was picked up, and uses that last check-in as an approximation of the time that the user received the order and exited the location.

In addition to a receipt confirmation option, the transaction system 106 via app 213 and 214 may also display to a user U on the device 102 a button option or equivalent functionality to initiate a communication directly to a representative of the provider of transaction server 106, such as a "Help" button or a "Feedback" button. These options may permit the user to communicate in real time to the provider of transaction server 106 or to communicate by other means such as text message or email.

Generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. In addition, the terms like "user equipment," "mobile station," "mobile," "communication device," "access terminal," "terminal," "handset," and similar terminology, refer to a wireless device (e.g., cellular phone, smart phone, computer, PDA, set-top box, Internet Protocol Television (IPTV), electronic gaming device, printer, and so forth) utilized by a user of a wireless communication service to receive or convey data, control, voice, video, sound, gaming, or substantially any data-stream or signaling-stream. The foregoing terms are utilized interchangeably in the subject specification and related drawings. The terms "component," "system," "platform," "module," and the like refer broadly to a computer-related entity or an entity related to an operational machine with one or more specific functionalities. Such entities can be hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The processing unit that executes commands and instructions may be a general purpose computer, but may utilize any of a wide variety of other technologies including a special purpose computer, a microcomputer, minicomputer, mainframe computer, programmed microprocessor, microcontroller, peripheral integrated circuit element, a CSIC (customer-specific integrated circuit), ASIC (application-specific integrated circuit), a logic circuit, a digital signal processor, a programmable logic device, such as an FPGA (field-programmable gate array), PLD (programmable logic device), PLA (programmable logic array), RFID processor, smart chip, or any other device or arrangement of devices that is capable of implementing the steps of the processes of the invention.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The mobile device 102 acts as a gateway for transmitting the user's data to the network 104. The mobile device 102 can support multiple communication channels for exchanging multimedia and other data with the servers 106,110 and other devices using a Wi-Fi LAN (e.g., IEEE 802.11 standard) for Internet access, a short-range Bluetooth wireless connection for point-to-point access, and/or an NFC channel for close-proximity access.

The storage devices 238, 242 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the UNIX operating system, the LINUX operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The storage devices 238, 242 may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or nonremovable memory interface The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described herein. For example, various forms of the flows shown above may be used, with steps re-ordered, added, or removed. Accordingly, other implementations are within the scope of the following claims.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A transaction server for predictively managing consumer pickup orders for goods, the server comprising:
   a processor;
   a communication facility in communication, over a telecommunication system, with (i) a plurality of merchant point-of-sale (POS) systems, (ii) a plurality of merchant ordering servers in communication with at least some of the merchant point-of-sale POS systems and (iii) a user device;
   a merchant database including records each specifying a merchant, merchant locations, goods sold by the merchant, prices of the goods, and a current wait time for order preparation received from the merchant POS system or ordering server of the specified merchant at each location; and
   a user database including records each specifying a user, a user device associated with the user, payment information for the user, and order history entries each specifying goods ordered and a date and time of the order;
   wherein the processor is configured to execute instructions to cause the transaction server to:
   a) predict, for a user, an order for pickup at a predicted pickup time at a merchant pickup location identified by a merchant pickup geolocation based on previous orders by the user with corresponding one or more dates and times in the user database to generate a user order prediction, the user order prediction including a predicted pickup time and merchant information identifying a merchant corresponding to the user;
   b) receive a user geolocation of the user;
   c) based on the user geolocation and the merchant pickup geolocation, estimate a travel time of the user to the merchant pickup location;
   d) transmit to the user device, via the communication facility, a proposed order corresponding to the predicted order if a current time plus the estimated travel time is not later than the predicted pickup time;
   e) receive, via the communication facility, user acceptance of the proposed order; and
   f) cause the proposed order to be placed with a merchant corresponding to the merchant pickup geolocation as a pickup order using the user payment information.

2. The system of claim 1, wherein the proposed order is transmitted if the current time plus the estimated travel time is approximately equal to the predicted pickup time.

3. The system of claim 1, wherein the merchant database also stores a current wait time for order preparation received from the merchant POS system of the specified merchant, the proposed order being transmitted if the current time plus the estimated travel time plus the current wait time is not later than the predicted pickup time.

4. The system of claim 1, wherein the proposed order is transmitted if the current time plus the estimated travel time plus the current wait time is approximately equal to the predicted pickup time.

5. A method of predictively managing consumer pickup orders for goods, the method comprising the steps of:
    storing a plurality of merchant records in a merchant database, each of the merchant records corresponding to one or more user records of a user database, wherein each of the user records identifies a registered user and user payment information of a corresponding user,
    predicting, for a user, an order for pickup based on previous orders at a predicted pickup time at a merchant pickup location identified by a merchant pickup geolocation, the previous orders placed by the user and corresponding to one or more dates and times in a user database to generate a user order prediction, the user order prediction including a predicted pickup time and a merchant information identifying a merchant corresponding to the user,
    wherein a plurality of merchant ordering servers of a plurality of merchant point-of-sale (POS) systems are in communication with at least some of the merchant POS systems and a user device of the user;
    receiving a user geolocation of the user;
    based on the user geolocation and the merchant pickup geolocation, estimating a travel time of the user to the merchant pickup location;
    transmitting to the user device, via the communication facility, a proposed order corresponding to the predicted order if a current time plus the estimated travel time is not later than the predicted pickup time;
    receiving, via the communication facility, user acceptance of the proposed order; and
    causing the proposed order to be placed with a merchant corresponding to the merchant pickup geolocation as a pickup order using the user payment information.

6. The method of claim 5, wherein the proposed order is transmitted if the current time plus the estimated travel time is approximately equal to the predicted pickup time.

7. The method of claim 5, further comprising the steps of periodically receiving, from the merchant POS systems, a current wait time for order preparation, the proposed order being transmitted if the current time plus the estimated travel time plus the current wait time is not later than the predicted pickup time.

8. The method of claim 5, wherein the proposed order is transmitted if the current time plus the estimated travel time plus the current wait time is approximately equal to the predicted pickup time.

9. A computer system comprising:
    a transaction server configured to store a plurality of merchant records in a merchant database, each of the merchant records corresponding to one or more user records of a user database, wherein each of the user records identifies a registered user and user payment information of a corresponding user,
    a processor;
    memory coupled to the processor and storing instructions which when executed by the processor cause the processor to execute:
    facilitating communication, over a telecommunication system, with a plurality of merchant point-of-sale (POS) systems, wherein at least one of the merchant POS systems is in communication with the transaction server through the telecommunication system;
    predicting an order for pickup at a predicted pickup time at a merchant pickup location identified by a merchant pickup geolocation and based on previous orders by a user with corresponding one or more dates and times in the user database to generate a user order prediction, the user order prediction including a predicted pickup time and a merchant information identifying a merchant corresponding to the user;
    receiving a user geolocation of the user;
    based on the user geolocation and merchant pickup geolocation, estimating a travel time of the user to the merchant pickup location;
    transmitting to a user device operated by the user, via the communication facility, proposed order corresponding to the predicted order if a current time plus the estimated travel time is not later than the predicted pickup time;
    receiving, via the communication facility, user acceptance of the proposed order; and
    causing the proposed order to be placed with a merchant corresponding to the merchant pickup geolocation as a pickup order using the user payment information.

10. The computer system of claim 9, further comprising the instructions executed by the processor cause the processor to execute periodically receiving a current wait time for order preparation and receiving the current wait time via the telecommunication network.

11. The computer system of claim 9, wherein the merchant records of the merchant database include records each specifying a corresponding merchant, goods sold by the corresponding merchant, and a pickup geolocation of the corresponding merchant.

12. The computer system of claim 9, wherein the user records of the user database include records each specifying a corresponding user and a payment information for the corresponding user.

* * * * *